US009416856B2

(12) United States Patent
Sakaguchi et al.

(10) Patent No.: US 9,416,856 B2
(45) Date of Patent: Aug. 16, 2016

(54) BALL SCREW DEVICE

(71) Applicant: JTEKT CORPORATION, Osaka-shi, Osaka (JP)

(72) Inventors: Naoko Sakaguchi, Toyota (JP); Akiyoshi Tashiro, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 20 days.

(21) Appl. No.: 14/206,594

(22) Filed: Mar. 12, 2014

(65) Prior Publication Data

US 2014/0260746 A1    Sep. 18, 2014

(30) Foreign Application Priority Data

Mar. 12, 2013 (JP) ................. 2013-049193
May 21, 2013 (JP) ................. 2013-107273

(51) Int. Cl.
*F16H 1/24* (2006.01)
*F16H 25/22* (2006.01)

(52) U.S. Cl.
CPC ........ *F16H 25/2204* (2013.01); *F16H 25/2214* (2013.01); *Y10T 74/19744* (2015.01)

(58) Field of Classification Search
CPC ............ F16H 25/2204; F16H 25/2214; F16H 25/2219; F16H 25/2228
USPC .................. 74/424.87, 424.81, 424.89, 89.23
See application file for complete search history.

(56) References Cited

U.S. PATENT DOCUMENTS

| | | | | |
|---|---|---|---|---|
| 5,094,119 A * | 3/1992 | Virga et al. | ................ | 74/89.42 |
| 5,142,929 A * | 9/1992 | Simpson, III | ............ | 74/424.87 |
| 6,082,210 A * | 7/2000 | Ise | .............. | 74/424.83 |
| 7,523,681 B2 * | 4/2009 | Pan et al. | ................ | 74/424.82 |
| 7,587,955 B2 * | 9/2009 | Vierheilig et al. | ........... | 74/89.44 |
| 7,992,461 B2 * | 8/2011 | Lin et al. | ................ | 74/424.86 |
| 8,863,601 B2 * | 10/2014 | Chen et al. | ................ | 74/424.87 |
| 2001/0022110 A1 * | 9/2001 | Roland | ............ | 74/424.87 |
| 2002/0026844 A1 * | 3/2002 | Fujita | ............ | 74/424.86 |
| 2008/0190230 A1 * | 8/2008 | Liao et al. | ................ | 74/424.83 |
| 2009/0090207 A1 * | 4/2009 | Chang et al. | ................ | 74/424.86 |
| 2009/0308192 A1 * | 12/2009 | Lin et al. | ................ | 74/424.81 |
| 2010/0058885 A1 * | 3/2010 | Uesugi et al. | .............. | 74/424.89 |

(Continued)

FOREIGN PATENT DOCUMENTS

GB    559407    2/1944
GB    1050926    12/1966

(Continued)

OTHER PUBLICATIONS

Extended European Search Report issued in European Patent Application No. 14158024.1 dated Jul. 7, 2014.

*Primary Examiner* — William Kelleher
*Assistant Examiner* — Zakaria Elahmadi
(74) *Attorney, Agent, or Firm* — Oliff PLC

(57) ABSTRACT

A ball screw device includes a cylinder that surrounds the outer periphery of a ball nut. Accommodation holes are formed in the ball nut at a rolling start position and a rolling end position in ball rolling paths. An outer periphery turning groove is formed in an outer peripheral face of the ball nut, and the outer periphery turning groove and an inner peripheral face of the cylinder constitute a turning rolling path. The turning rolling path and connection passages formed in deflectors constitute a circulation path through which balls are returned from the rolling end position to the rolling start position.

7 Claims, 18 Drawing Sheets

(56) References Cited

U.S. PATENT DOCUMENTS

2010/0236345 A1* 9/2010 Miyahara et al. .......... 74/424.83
2010/0242651 A1* 9/2010 Shirai et al. ................ 74/424.83
2010/0275710 A1* 11/2010 Wingett et al. ............ 74/424.82
2010/0288063 A1* 11/2010 Wu ................................ 74/89.4
2012/0266702 A1* 10/2012 Allegri et al. ............... 74/89.34
2013/0220047 A1* 8/2013 Yokoyama et al. ........ 74/424.87
2013/0283953 A1* 10/2013 Iwasaki ...................... 74/424.87

FOREIGN PATENT DOCUMENTS

JP  A-2003-156117  5/2003
JP  A-2010-71411  4/2010

* cited by examiner

BALL SCREW DEVICE

INCORPORATION BY REFERENCE

The disclosures of Japanese Patent Applications No. 2013-49193 and No. 2013-107273 respectively filed on Mar. 12, 2013 and May 21, 2013, each including the specification, drawings and abstract, are incorporated herein by reference in their entireties.

BACKGROUND OF THE INVENTION

1. Field of the Invention

The invention relates to a ball screw device.

2. Description of the Related Art

A ball screw device described in Japanese Patent Application Publication No. 2010-71411 (JP 2010-71411 A) has a circulation path that provides communication between one end portion and the other end portion of a ball rolling path to allow balls to circulate along a raceway. The circulation path has a through-hole formed so as to pass through a peripheral wall of a ball nut in its axial direction, a feed-side communication passage that provides communication between one end of the through-hole and the one end portion of the ball rolling path, and a discharge-side communication passage that provides communication between the other end of the through-hole and the other end portion of the ball rolling path. The feed-side communication passage is formed in a feed-side deflector member attached to the peripheral wall of the ball nut, and the discharge-side communication passage is formed in a discharge-side deflector member attached to the peripheral wall of the ball nut.

The through-hole described in JP 2010-71411 A is formed through, for example, drilling. To facilitate the drilling, the through-hole needs to extend along the axial direction of the ball nut. However, if the through-hole is limited to the one that extends along the axial direction, the positions in the circumferential direction, where the paired deflectors (the feed-side deflector member and the discharge-side deflector member) are arranged, are limited. Therefore, in the ball screw device configured as described above, the adoptable number of turns is automatically limited to numbers of turns having a predetermined decimal fraction such as 7, that is, limited to, for example, 1.7 turns and 2.7 turns. Even if the theoretically required effective number of the turns of the ball screw device is, for example, 2.3, it is necessary to employ the ball screw device of which the effective number of the turns is 2.7. Therefore, there is a possibility that the ball screw device becomes larger than necessary in the axial direction.

SUMMARY OF THE INVENTION

If the positions in the circumferential direction, where deflectors are arranged, are not limited, the theoretically effective number of the turns of a ball screw device can be employed as it is. Consequently, it is possible to reduce the size of the ball screw device in the axial direction.

One object of the invention is to provide a ball screw device that makes it possible to increase the flexibility of the layout of the positions where deflectors are arranged, while allowing balls to be smoothly circulated in a ball rolling path.

A ball screw device according to an aspect of the invention includes: a threaded shaft having an outer peripheral face in which a groove is formed; a ball nut fitted onto the threaded shaft and having an inner peripheral face in which a groove is formed; a plurality of balls rollably disposed in a spiral ball rolling path formed by the groove of the ball nut and the groove of the threaded shaft; and cylinder disposed so as to surround an outer periphery of the ball nut. In the ball rolling path, accommodation recesses that pass through a peripheral wall of the ball nut in a thickness direction are formed in at least two accommodation recess formed positions that are apart from each other in an axial direction of the threaded shaft. In an outer peripheral face of the ball nut, an outer periphery turning groove that turns in a spiral manner along the outer periphery of the ball nut is formed, and the outer periphery turning groove and an inner peripheral face of the cylinder constitute a turning rolling path in which the balls are rollable. The ball screw device further includes: deflectors accommodated in the respective accommodation recesses, and each having a connection passage that connects a corresponding one of the accommodation recess formed positions to the turning rolling path; and a relative rotation prohibiting structure that prohibits rotation of the cylinder relative to the ball nut. The turning rolling path and the two connection passages constitute a circulation path through which the balls are returned from one of the accommodation recess formed positions to the other one of the accommodation recess formed positions.

According to the aspect described above, each ball rolls in the ball rolling path, to the one accommodation recess formed position from the other accommodation recess formed position. The ball passes through the connection passage of one of the deflectors from the one accommodation recess formed position, and is picked up into the outer periphery turning groove of the outer peripheral face of the ball nut. The ball picked up into the outer periphery turning groove passes through the turning rolling path formed by the outer periphery turning groove to turn around the outer periphery of the ball nut, passes through connection passage of the other deflector, and is then returned to the other accommodation recess formed position in the ball rolling path. That is, the ball is returned from the one accommodation recess formed position in the ball rolling path to the other accommodation recess formed position in the ball rolling path through the circulation path including the turning rolling path. Thus, it is possible to smoothly circulate the balls through the ball rolling path.

The turning rolling path included in the circulation path is formed by the outer periphery turning groove of the outer peripheral face of the ball nut and the inner peripheral face of the cylinder. Therefore, regardless of the relative positional relationship between the two accommodation recess formed positions in the axial direction and in the circumferential direction, it is possible to connect the one accommodation recess formed position to the other accommodation recess formed position via the circulation path. There is no limitation on the relative positions in the circumferential direction, where the deflectors are arranged, unlike in the case where a through-hole extending along the axial direction is formed in the peripheral wall of the ball nut. Consequently, it is possible to increase the flexibility of the layout of the positions where the deflectors are arranged. There is no limitation on the positions in the circumferential direction, where the deflectors are arranged. As a result, the theoretically effective number of the turns of the ball screw device can be employed as it is. Consequently, it is possible to reduce the size of the ball screw device in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
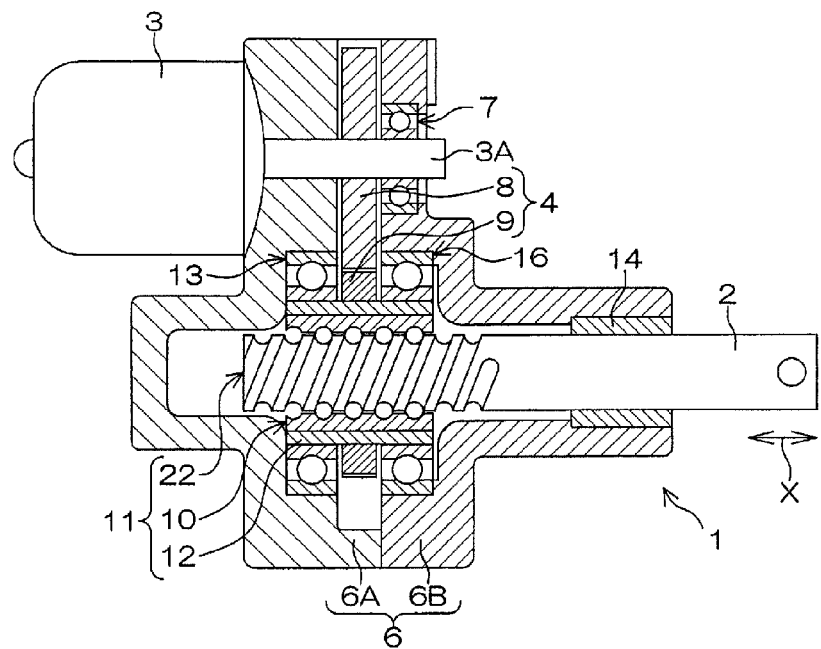
FIG. 1 is a schematic sectional view of an electric actuator to which a ball screw device according to a first embodiment of the invention is applied.

Hereinafter, example embodiments of the invention will be described with reference to the accompanying drawings. FIG. 1 is a schematic sectional view of an electric actuator 1 to which a ball screw device 11 according to a first embodiment of the invention is applied. The electric actuator 1 moves a drive shaft 2 back and forth in an axial direction X to drive an object to be driven.

The electric actuator 1 includes: an electric motor 3; the drive shaft 2; a speed reduction mechanism 4 that transmits rotary torque output from the electric motor 3; the ball screw device 11 that converts the rotary torque output from the electric motor 3 and transmitted via the speed reduction mechanism 4, into a linear motion of the drive shaft 2 in the axial direction X; and a housing 6 in which the drive shaft 2, the speed reduction mechanism 4 and the ball screw device 11 are accommodated. The housing 6 has a first housing 6A, and a second housing 6B brought into contact with an end face of the first housing 6A, and the housings 6A, 6B are joined to each other with a fixing bolt (not illustrated).

The electric motor 3 is attached to the first housing 6A. An output shaft 3A of the electric motor 3 extends through the first housing 6A, and is rotatably supported by a rolling bearing 7 attached to the second housing 6B. The drive shaft 2 is formed integrally with a threaded shaft 22 of the ball screw device 11. The drive shaft 2 is rotatably supported via a plain bearing 14 in the second housing 6B.

The speed reduction mechanism 4 includes a first gear 8 and a second gear 9. The first gear 8 is accommodated and disposed in a space between the first housing 6A and the second housing 6B, and is attached to an end portion of the output shaft 3A of the electric motor 3 so as not to be rotatable relative to the output shaft 3A. The second gear 9 is fitted onto the outer periphery of a ball nut 10, and engaged with the first gear 8. The ball nut 10 is rotatably supported by a rolling bearing 13 fitted to the inner periphery of the first housing 6A and a rolling bearing 16 attached to the inner periphery of the second housing 6B. The second gear 9, the rolling bearing 13 and the rolling bearing 16 are fixedly fitted to the outer periphery of the ball nut 10.

Figure 2:
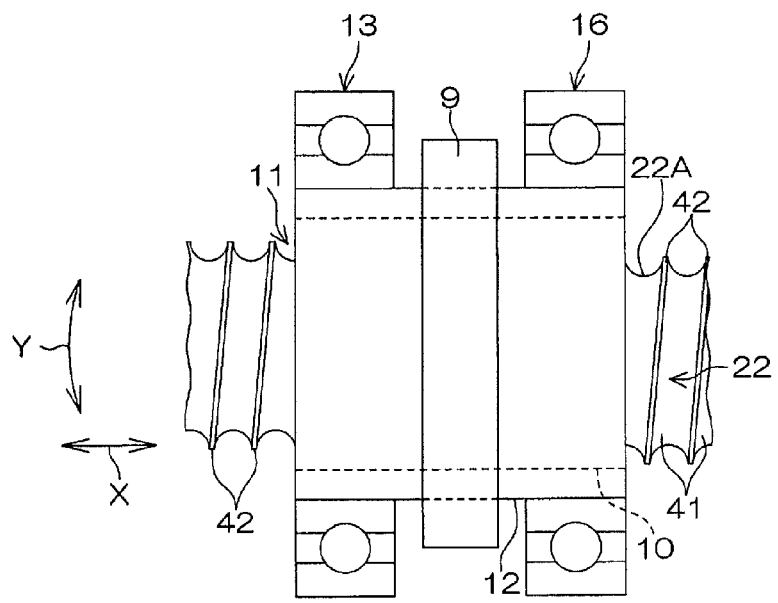
FIG. 2 is a schematic side view of the ball screw device according to the first embodiment of the invention.
Figure 3:
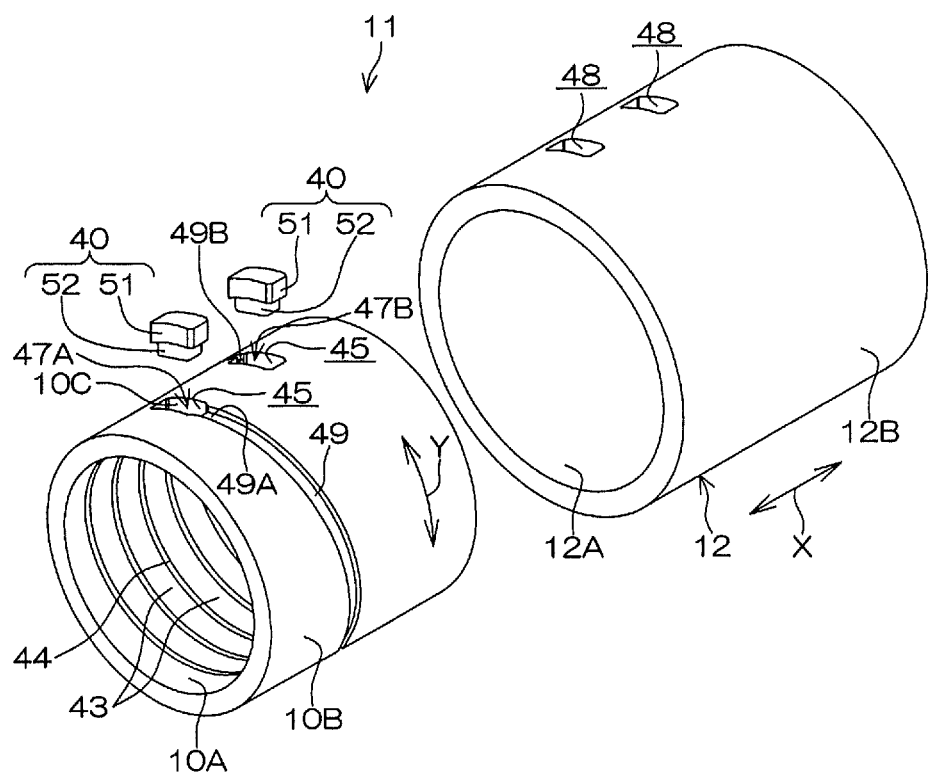
FIG. 3 is an exploded perspective view of the ball screw device according to the first embodiment of the invention.
Figure 4:
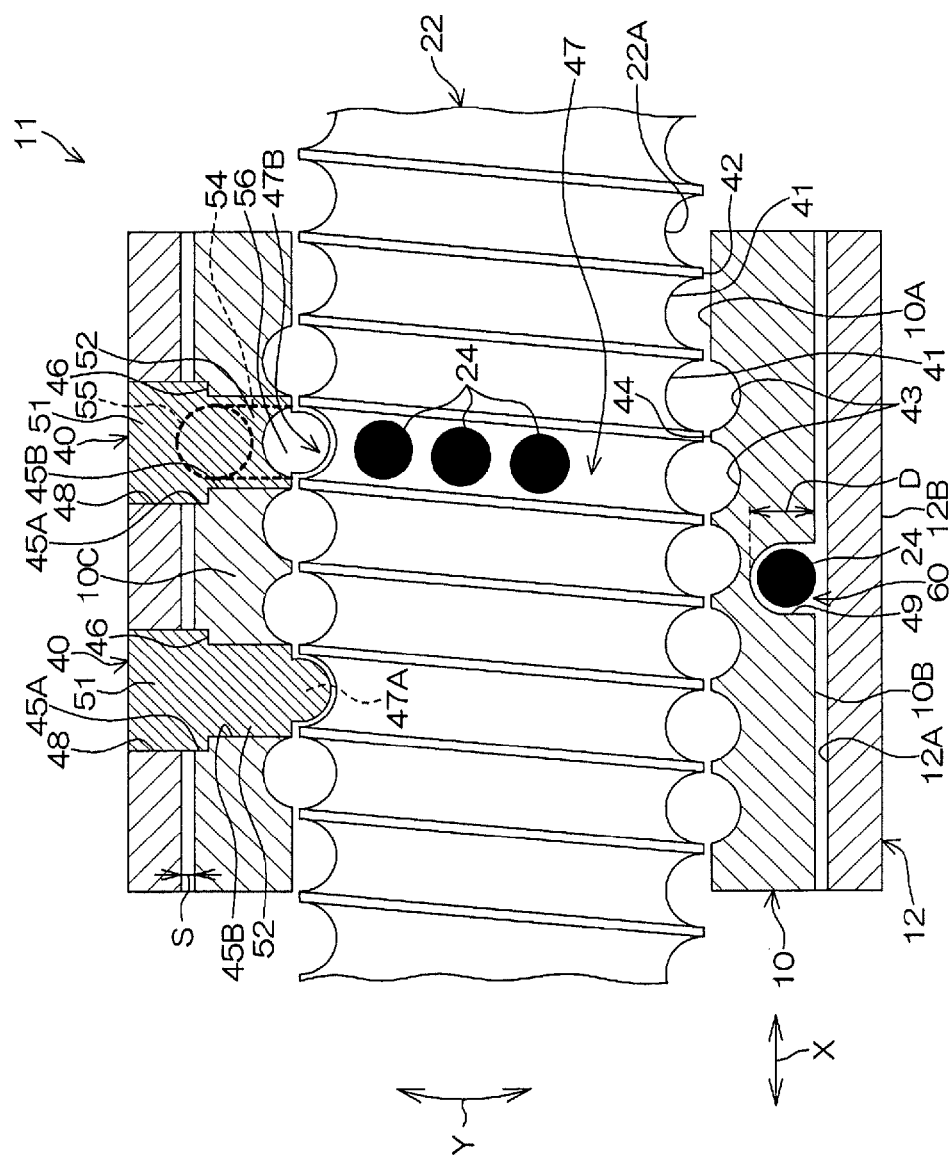
FIG. 4 is a schematic vertical sectional view of the ball screw device according to the first embodiment of the invention.

FIG. 2 is a schematic side view of the ball screw device 11. FIG. 3 is an exploded perspective view of the ball screw device 11. FIG. 3 illustrates the configuration of the ball screw device 11 from which the threaded shaft 22 is omitted. FIG. 4 is a schematic vertical sectional view of the ball screw device 11. As illustrated in FIG. 2 to FIG. 4, the ball screw device 11 includes the threaded shaft 22 that extends along the axial direction X, the ball nut 10 fitted onto the threaded shaft 22, a plurality of balls 24 interposed between the threaded shaft 22 and the ball nut 10, a cylinder 12 that surrounds the outer periphery of the ball nut 10, and a pair of deflectors 40. In other words, the axial direction X is the axial direction of the threaded shaft 22. In the ball screw device 11, the theoretically required effective number of turns is 2.7, and the theoretically effective number of the turns, that is, 2.7 is employed as it is.

As illustrated in FIG. 2 and FIG. 4, grooves 41 are formed in an outer peripheral face 22A of the threaded shaft 22. The grooves 41 are spiral grooves gradually shifted toward the other side (right side of FIG. 2 and FIG. 4) in the axial direction X while turning around the central axis of the threaded shaft 22. Each groove 41 has a generally U-shaped curved face in section. In the outer peripheral face 22A, spiral ridges 42 are formed so as to constitute boundaries between the grooves 41 adjacent to each other in the axial direction X.

As illustrated in FIG. 3 and FIG. 4, the ball nut 10 is a tubular body made of metal such as steel and extending in the axial direction X. An inner peripheral face 10A and an outer peripheral face 10B of the ball nut 10 are cylindrical faces each having the central axis extending in the axial direction X. In the inner peripheral face 10A of the ball nut 10, grooves 43 are formed. The grooves 43 are spiral grooves gradually shifted toward the other side (right side of FIG. 4) in the axial direction X while turning around the central axis of the inner peripheral face 10A. Each groove 43 has a generally U-shaped curved face in section. In the inner peripheral face 10A, spiral ridges 44 are formed so as to constitute boundaries between the grooves 43 adjacent to each other in the axial direction X.

In the inner peripheral face 10A of the ball nut 10, two accommodation holes (accommodation recesses) 45 are formed. In the inner peripheral face 10A, the two accommodation holes 45 are formed at a rolling start position (the other accommodation recess formed position) 47A and a rolling end position (one accommodation recess formed position) 47B at an interval in the axial direction X. More specifically, the two are opened at the inner walls of the grooves 43 formed in the inner peripheral face 10A. The two accommodation holes 45 are arranged at an interval (corresponding to three grooves 43 in the present embodiment) in the axial direction X so as to be parallel to each other. The accommodation holes 45 extend radially outward from the inner peripheral face 10A, and pass through a peripheral wall 10C of the ball nut 10 in the radial direction.

In a region where the inner peripheral face 10A of the ball nut 10 is present in the axial direction X, ball rolling paths 47 (see FIG. 4) are formed by the grooves 43 of the ball nut 10 and the grooves 41 present in a portion of the outer peripheral face 22A of the threaded shaft 22, which faces the inner peripheral face 10A. That is, the spiral ball rolling paths 47 are formed by the grooves 43 of the ball nut 10 and the grooves 41 of the threaded shaft 22. Each ball rolling path 47 has a generally circular section (see FIG. 4). The ball rolling paths 47 have a spiral form, and gradually shifted toward the other side (right side of FIG. 4) in the axial direction X while turning around the central axis of the ball nut 10 and the threaded shaft 22. Between the ball rolling paths 47 adjacent to each other in the axial direction X, the ridge 42 of the threaded shaft 22 and the ridge 44 of the ball nut 10 are located so as to face each other in the radial direction. The ridge 42 and the ridge 44 form a boundary between the two ball rolling paths 47 adjacent to each other in the axial direction X.

As illustrated in FIG. 4, each accommodation hole 45 has an outer region 45A located close to the outer peripheral face 10B of the ball nut 10 and an inner region 45B located closer to the inner peripheral face 10A than the outer region 45A. As viewed from outside the ball nut 10 (outside the ball nut 10 in the radial direction), each accommodation hole 45 (both the outer region 45A and the inner region 45B) is elongated along a direction that is tilted with respect to a circumferential direction Y by an angle corresponding to the tilt angle of each groove 43.

In a portion of the ball nut 10, which defines each accommodation hole 45, a step portion 46 that constitutes the boundary between the outer region 45A and the inner region 45B is formed. As illustrated in FIG. 3 and FIG. 4, in the outer peripheral face 10B of the ball nut 10, an outer periphery turning groove 49 is formed. The outer periphery turning groove 49 is a spiral groove shifted to one side (left side of FIG. 4) in the axial direction X while turning around the central axis of the outer peripheral face 10B (i.e., the central axis of the inner peripheral face 10A). In other words, the outer periphery turning groove 49 turns in a spiral manner along the outer peripheral face 10B.

In the present embodiment, an outer periphery turning groove having one turn is illustrated as the outer periphery turning groove 49. The outer periphery turning groove 49 has a generally U-shape with round corners (a generally semicircular shape) or a generally U-shape with angled corners (a generally U-shape with round corners in FIG. 4) in section. The outer periphery turning groove 49 has a groove depth D (see FIG. 4) with which the entirety of each ball 24 (illustrated by each black circle in FIG. 4) can be accommodated, and is formed through cutting performed with the use of an end mill or the like. One end 49A (see FIG. 3) of the outer periphery turning groove 49 is connected to a portion of the peripheral wall 10C, which defines the accommodation hole 45 on the rolling start position 47A side (lower left side in FIG. 3), and the other end 49B of the outer periphery turning groove 49 is connected to a portion of the peripheral wall 10C, which defines the accommodation hole 45 on the rolling end position 47B side (upper right side in FIG. 3).

A turning rolling path 60 is formed by the outer periphery turning groove 49 and an inner peripheral face 12A of the cylinder 12. The turning rolling path 60 is a spiral path gradually shifted toward the one side (left side of FIG. 4) in the axial direction X while turning around the central axis of the ball nut 10 and the threaded shaft 22. Note that the axial direction in which the turning rolling path 60 is headed is opposite to the axial direction in which the ball rolling paths 47 are headed.

As illustrated in FIG. 4, each ball 24 is a small spherical body made of metal or the like, disposed in the ball rolling paths 47, and rollable in the ball rolling paths 47. Note that, for convenience of description, FIG. 4 illustrates only some of the balls 24 disposed in the ball rolling paths 47 (see black circles in FIG. 4) (this also applies to later-described FIG. 6, FIG. 7, FIG. 9, FIG. 14, FIG. 17, FIG. 18, and FIG. 22 to FIG. 25).

As illustrated in FIG. 3 and FIG. 4, the cylinder 12 is made of metal such as steel, and the inner peripheral face 12A and an outer peripheral face 12B of the cylinder 12 are cylindrical faces that are coaxial with the inner peripheral face 10A and the outer peripheral face 10B of the ball nut 10. No grooves are formed in the inner peripheral face 12A and the outer peripheral face 12B of the cylinder 12, and the inner peripheral face 12A and the outer peripheral face 12B are formed of only cylindrical faces, except positions where engagement holes 48 (described later) are formed. The cylinder 12 is attached to the ball nut 10 so as to be rotatable together with the ball nut 10 and movable in the axial direction X together with the ball nut 10 in the state where the entire region of the outer peripheral face 10B of the ball nut 10 is surrounded by the cylinder 12. The inner diameter of the cylinder 12 is set slightly larger than the outer diameter of the ball nut 10. In the state where the cylinder 12 is attached to the ball nut 10, the inner peripheral face 12A of the cylinder 12 is disposed radially outward of the outer peripheral face 10B of the ball nut 10 across a small space S.

As illustrated in FIG. 3 and FIG. 4, the two engagement holes (engagement recesses) 48 that pass through the cylinder 12 in its thickness direction are formed in the inner peripheral face 12A of the cylinder 12. The number of the engagement holes 48 is the same as the number of the accommodation holes 45 (two in the present embodiment). The two engagement holes 48 are arranged at an interval (corresponding to three grooves 43 in the present embodiment) in the axial direction X so as to be parallel to each other. In the state where the cylinder 12 is disposed so as to be rotatable together with the ball nut 10, the shapes of the two engagement holes 48 as viewed from the outside in the radial direction match the shapes of the outer regions 45A of the accommodation holes 45 (see FIG. 4).

Figure 5A:
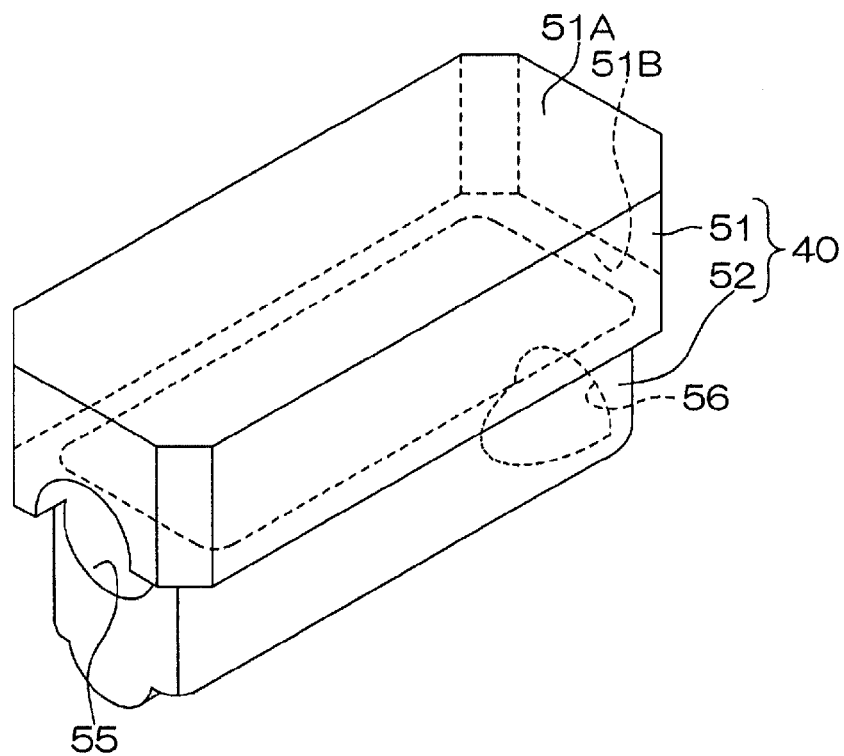
FIG. 5A is a perspective view of a deflector according to the first embodiment of the invention (first)
Figure 5B:
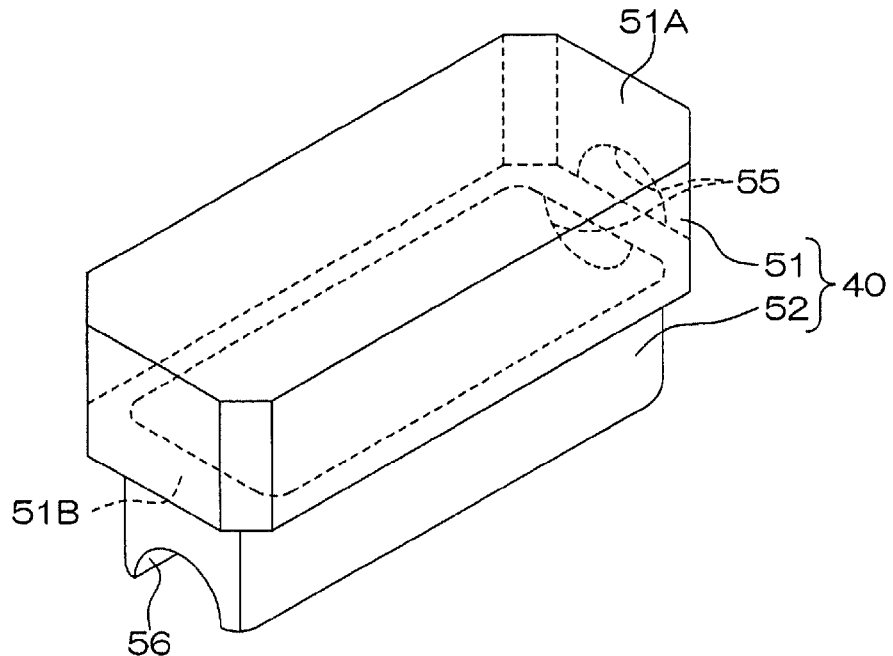
FIG. 5B is a perspective view of the deflector according to the first embodiment of the invention (second)

The deflectors 40 are small pieces. The number of the deflectors 40 is the same as the number of the accommodation holes 45 (two in the present embodiment). Each deflector 40 is fitted in a corresponding one of the accommodation holes 45. Each deflector 40 is passed through both the accommodation hole 45 and the engagement hole 48. The material of the deflectors 40 may be, for example, resin or metal. FIG. 5A is a perspective view of the deflector 40. FIG. 5B is a perspective view of the deflector 40 as viewed from the right side in FIG. 5A. As illustrated in FIG. 5A and FIG. 5B, the deflector 40 is a single-piece member having an outer portion 51 and an inner portion 52.

The outer portion 51 is a block. The outer portion 51 has such a shape as to be just fitted in a region obtained by combining the outer region 45A of the accommodation hole 45 (see FIG. 4) and the engagement hole 48, in the state where the cylinder 12 is attached to the ball nut 10. The outer portion 51 is, for example, a rectangular parallelepiped body in which edges of four corners are chamfered. A face of the outer portion 51, which is noticeably illustrated in FIG. 5A and FIG. 5B, will be referred to as an outer face 51A. In FIG. 5A and FIG. 5B, the outer face 51A is drawn in a flat face, but the outer face 51A is curved so as to be flush with the outer peripheral face 12B of the cylinder 12.

The inner portion 52 is a block elongated along the longitudinal direction of the outer portion 51. The inner portion 52 has such a shape as to be just fitted in the inner region 45B of the accommodation hole 45 (see FIG. 4). Both end portions of the inner portion 52 in the longitudinal direction are rounded. A face of the outer portion 51, which is on the opposite side of the outer portion 51 from the outer face 51A, will be referred to as an inner face 51B. The inner portion 52 is fixed to the inner face 51B. As viewed from the thickness direction of the outer portion 51, the inner portion 52 is positioned inside the contour of the outer portion 51.

Each deflector 40 has a connection passage 54. In the deflector 40, the connection passage 54 extends in the form of a tunnel to provide communication between a circular outer opening 55 opened at one longitudinal end face (the left end face in FIG. 5A) of the deflector 40 and a circular inner opening 56 opened at the other longitudinal end face (the right end face in FIG. 5A) of the deflector 40. The connection passage 54 has a circular cross section. The outer opening 55 and the inner opening 56 differ in radial position (distance from the central axis), and the outer opening 55 is located radially outward of the inner opening 56. Therefore, the connection passage 54 is tilted radially outward from the inner opening 56 toward the outer opening 55.

As illustrated in FIG. 4, each deflector 40 is fitted (inserted) from the cylinder 12 side, more specifically, from radially outside the cylinder 12, into the accommodation hole 45 of the ball nut 10 and the engagement hole 48 of the cylinder 12. In the state where the deflector 40 is fitted in both the accommodation hole 45 and the engagement hole 48, the outer portion 51 is accommodated in the outer region 45A of the accommodation hole 45 and the engagement hole 48, and the inner portion 52 is accommodated in the inner region 45B of the accommodation hole 45. At this time, the peripheral edge portion of the inner face 5113 of the outer portion 51 is brought into contact with the step portion 46 in the accommodation hole 45 from radially outside the ball nut 10, so that the deflector 40 is positioned in the accommodation hole 45. Four corners of the rectangular outer portion 51 of each deflector 40 are crimped from the outer face 51A side, so that the deflector 40 is fixed to both the ball nut 10 and the cylinder 12. The deflector 40 fitted in the accommodation hole 45 is engaged with the peripheral wall surrounding the engagement hole 48 (fitted into the engagement hole 48), so that the rotation of the cylinder 12 relative to the ball nut 10 and the movement of the cylinder 12 relative to the ball nut 10 in the axial direction X are prohibited. In the first embodiment, a relative rotation prohibiting structure has the engagement holes 48 and the deflectors 40. In the relative rotation prohibiting structure, part of each deflector 40 accommodated in a corresponding one of the accommodation holes 45 is fitted in (engaged with) a corresponding one of the engagement holes 48.

Figure 6:
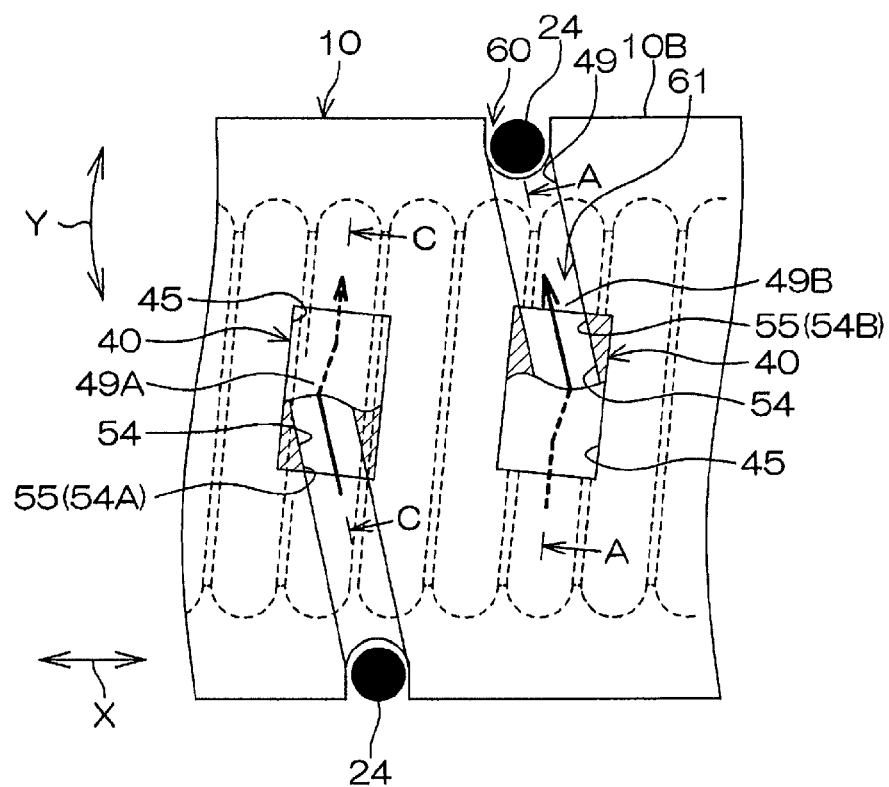
FIG. 6 is a view of a ball nut to which deflectors are attached, as viewed from the outside in the radial direction.

FIG. 6 is a view of the ball nut 10 to which the deflectors 40 are attached, as viewed from the outside in the radial direction. The deflector 40 fitted in the accommodation hole 45 on the rolling start position 47A side (lower left side in FIG. 3) and the deflector 40 fitted in the accommodation hole 45 on the rolling end position 47B side (upper right side in FIG. 3) are disposed so as to be oriented toward the opposite sides in a circumferential direction Y. One of the deflectors 40 is fitted in the accommodation hole 45 on the rolling start position 47A side (lower left side in FIG. 3) such that the outer opening 55 of the deflector 40 faces the one end 49A of the outer periphery turning groove 49, and the other one of the deflectors 40 is fitted in the accommodation hole 45 on the rolling end position 47B side (upper right side in FIG. 3) such that the outer opening 55 of the deflector 40 faces the other end 49B of the outer periphery turning groove 49.

In the state where the deflectors 40 are attached to the ball nut 10 and the cylinder 12, the outer opening 55 of the connection passage 54 of the deflector 40 communicates with (joins) the outer periphery turning groove 49 (the turning rolling path 60) that is present at the same position as the outer opening 55 in the axial direction X. In this state, the inner opening 56 of the connection passage 54 of the deflector 40 communicates with the ball rolling path 47 that is present at the same position as the inner opening 56 in the axial direction X. Thus, the connection passages 54 of the two deflectors 40 and the turning rolling path 60 formed by the outer periphery turning groove 49 and the inner peripheral face 12A of the cylinder 12 constitute a bypass of the ball rolling paths 47 in the axial direction X. The turning rolling path 60 and the two connection passages 54 constitute a circulation path 61 through which the balls 24 are returned from the rolling end position 47B in the ball rolling path 47 to the rolling start position 47A in the ball rolling path 47.

Figure 7:
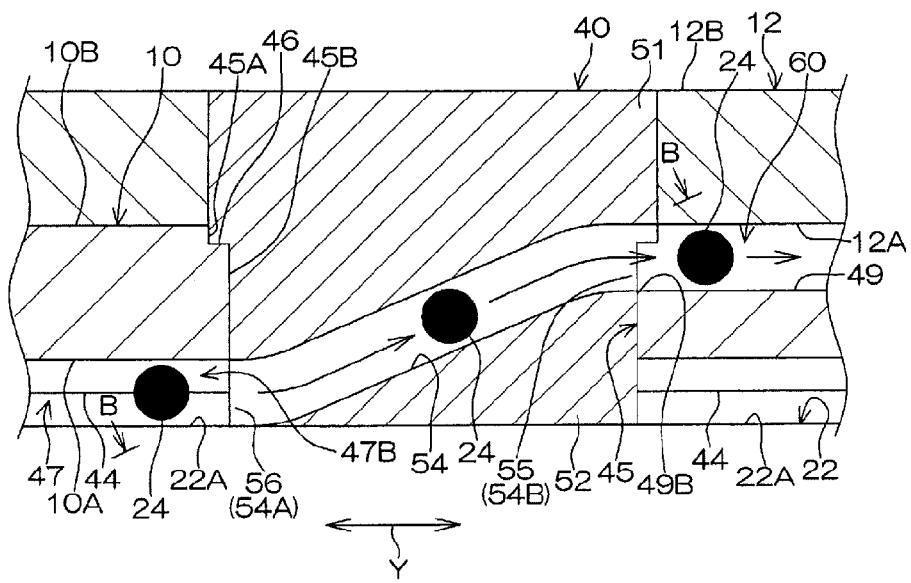
FIG. 7 is a sectional view taken along the line A-A in FIG. 6.
Figure 8:
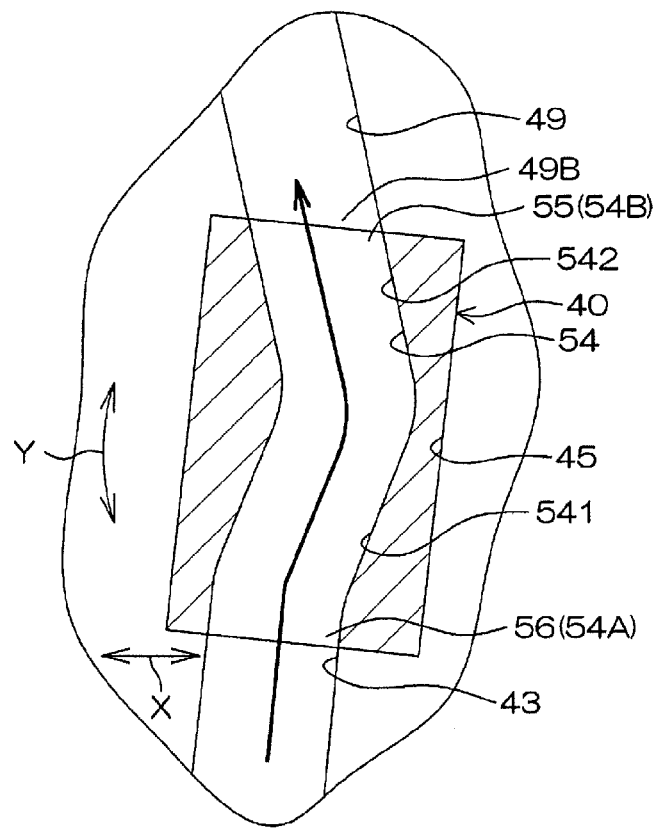
FIG. 8 is a sectional view taken along the line B-B in FIG. 7.

FIG. 7 is a sectional view taken along the line A-A in FIG. 6. FIG. 8 is a sectional view taken along the line B-B in FIG. 7. Note that in FIG. 7, for the sake of convenience, the circumferential direction Y is drawn as a linear direction. Therefore, the outer peripheral face 22A of the threaded shaft 22 and the inner and outer peripheral faces 10A, 10B of the ball nut 10 are drawn as straight lines in FIG. 7, but in actuality, they have a circular-arc shape (this also applies to later-described FIG. 9, FIG. 17, FIG. 18, FIG. 24 and FIG. 25).

As illustrated in FIG. 6 to FIG. 8, the deflector 40 fitted in the accommodation hole 45 on the rolling end position 47B side (upper right side in FIG. 3) is used to guide the balls 24 from the ball rolling paths 47 formed on the inner periphery of the ball nut 10 to the turning rolling path 60 on the outer periphery of the ball nut 10. The inner opening 56 of the connection passage 54 functions as an inlet 54A, and the outer opening 55 of the connection passage 54 functions as an outlet 54B.

As illustrated in FIG. 7, a portion of the connection passage 54 other than the outer opening 55 and the inner opening 56 has a linear shape in a section taken along the direction extending along the connection passage 54 and perpendicular to the circumferential direction Y. On the other hand, portions of the connection passage 54 near the outer opening 55 and the inner opening 56 have a curved shape with a gradient lower than that of the other portion of the connection passage 54.

As illustrated in FIG. 8, the connection passage 54 is bent in a doglegged form along the circumferential direction Y. Specifically, the connection passage has a first portion 541 that extends substantially linearly and is tilted slightly with respect to the groove 43, and a second portion 542 that extends substantially linearly along the outer periphery turning groove 49. The connection passage 54 provides communication between the groove 43 and the outer periphery turning groove 49 that extend in the directions different from each other.

Figure 9:
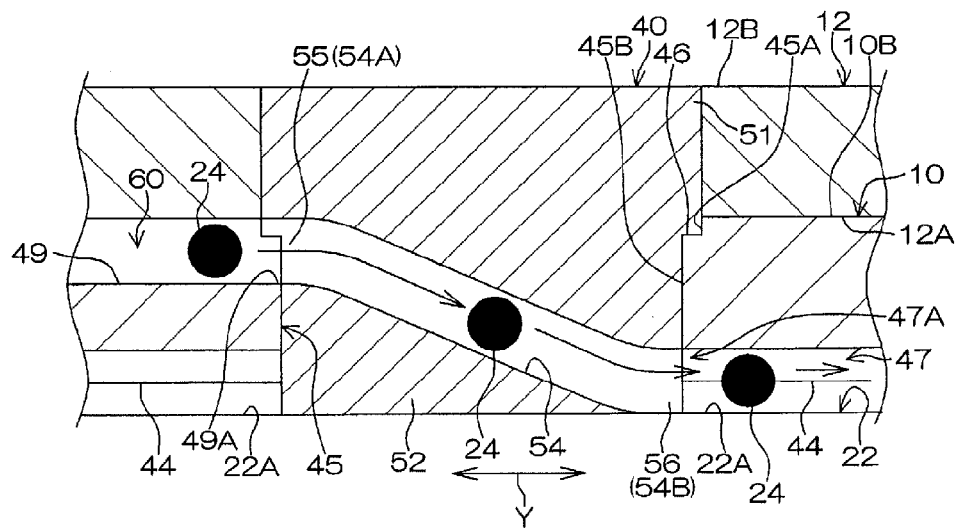
FIG. 9 is a sectional view taken along the line C-C in FIG. 6.

FIG. 9 is a sectional view taken along the line C-C in FIG. 6. As illustrated in FIG. 6 and FIG. 9, the deflector 40 fitted in the accommodation hole 45 on the rolling start position 47A side (lower left side in FIG. 3) is used to guide the balls 24 from the turning rolling path 60 formed on the outer periphery of the ball nut 10 to the ball rolling paths 47 formed on the inner periphery of the ball nut 10. The outer opening 55 of the connection passage 54 functions as the inlet 54A, and the inner opening 56 of the connection passage 54 functions as the outlet 54B. Note that the deflector 40 fitted in the accommodation hole 45 on the rolling start position 47A side (lower left side in FIG. 3) has the same design as that of the deflector 40 fitted in the accommodation hole 45 on the rolling end position 47B side (upper right side in FIG. 3).

As illustrated in FIG. 6 to FIG. 9, the balls 24 in the ball rolling paths 47 move from the rolling start position 47A to the rolling end position 47B along the ball rolling paths 47 while rolling in the ball rolling paths 47 as the ball nut 10 rotates. When each ball 24 reaches the rolling end position 47B, the ball 24 enters the connection passage 54 from the inner opening 56 of the connection passage 54 of the deflector 40 fitted in the accommodation hole 45 on the rolling end position 47B side (upper right side in FIG. 3), passes through the connection passage 54, and is picked up into the outer periphery turning groove 49 of the outer peripheral face 10B of the ball nut 10 (see a broken-line arrow illustrated in FIG. 6).

The ball 24 moves through the turning rolling path 60 including the outer periphery turning groove 49 to turn around the outer periphery of the ball nut 10, thereby advancing in a direction opposite to the direction in which the ball 24 has been advancing in the axial direction X (thereby advancing in a direction toward the left side in FIG. 6). Then, the ball 24, which has passed through the turning rolling path 60, enters the connection passage 54 from the outer opening 55 (the inlet 54A) of the connection passage 54 of the deflector 40 fitted in the accommodation hole 45 on the rolling start position 47A side (lower left side in FIG. 3), passes through the connection passage 54, and is returned to the rolling start position 47A in the ball rolling path 47 (see a broken-line arrow illustrated in FIG. 6). The balls 24 moving in the ball rolling paths 47 are circulated through the circulation path 61 including the turning rolling path 60 and the connection passages 54. Thus, it is possible to stably supply the balls 24 into the ball rolling paths 47.

According to the present embodiment described above, each ball 24 moves in the ball rolling paths 47 from the rolling start position 47A to the rolling end position 47B, passes through the connection passage 54 of one of the deflectors 40 from the rolling end position 47B, and is picked up into the outer periphery turning groove 49 of the outer peripheral face 10B of the ball nut 10. The ball 24 picked up into the outer periphery turning groove 49 passes through the turning rolling path 60 formed by the outer periphery turning groove 49 to turn around the outer periphery of the ball nut 10, passes through connection passage 54 of the other deflector 40, and is then returned to the rolling start position 47A in the ball rolling path 47. That is, the ball 24 is returned from the rolling end position 47B in the ball rolling path 47 to the rolling start position 47A in the ball rolling path 47 through the circulation path 61 including the turning rolling path 60. Thus, it is possible to smoothly circulate the balls 24 through the ball rolling paths 47.

The turning rolling path 60 included in the circulation path 61 is formed by the outer periphery turning groove 49 of the outer peripheral face 10B of the ball nut 10 and the inner peripheral face 12A of the cylinder 12. Therefore, regardless of the relative positional relationship between the rolling start position 47A and the rolling end position 47B in the axial direction X and in the circumferential direction Y, it is possible to connect the rolling start position 47A and the rolling end position 47B via the circulation path 61. There is no limitation on the relative positions in the circumferential direction Y, where the deflectors 40 are arranged, unlike in the case where a through-hole extending along the axial direction X is formed in the peripheral wall 10C of the ball nut 10. Consequently, it is possible to increase the flexibility of the layout of the positions where the deflectors 40 are arranged. There is no limitation on the positions in the circumferential direction Y, where the deflectors 40 are arranged. As a result, the theoretically effective number of the turns of the ball screw device 11 can be employed as it is. Consequently, it is possible to reduce the size of the ball screw device 11 in the axial direction X.

Each deflector 40 fitted in a corresponding one of the accommodation holes 45 is engaged with the peripheral wall around a corresponding one engagement holes 48, so that the rotation of the cylinder 12 relative to the ball nut 10 and the movement of the cylinder 12 relative to the ball nut 10 in the axial direction X are prohibited. That is, the ball nut 10 and cylinder 12 are positioned in both the axial direction X and the circumferential direction Y. Thus, the relative rotation prohibiting structure is formed without using additional components. As a result, it is possible to prevent the number of components from increasing while prohibiting the rotation of the cylinder 12 relative to the ball nut 10 and the movement of the cylinder 12 in the axial direction X relative to the ball nut 10.

Figure 10:
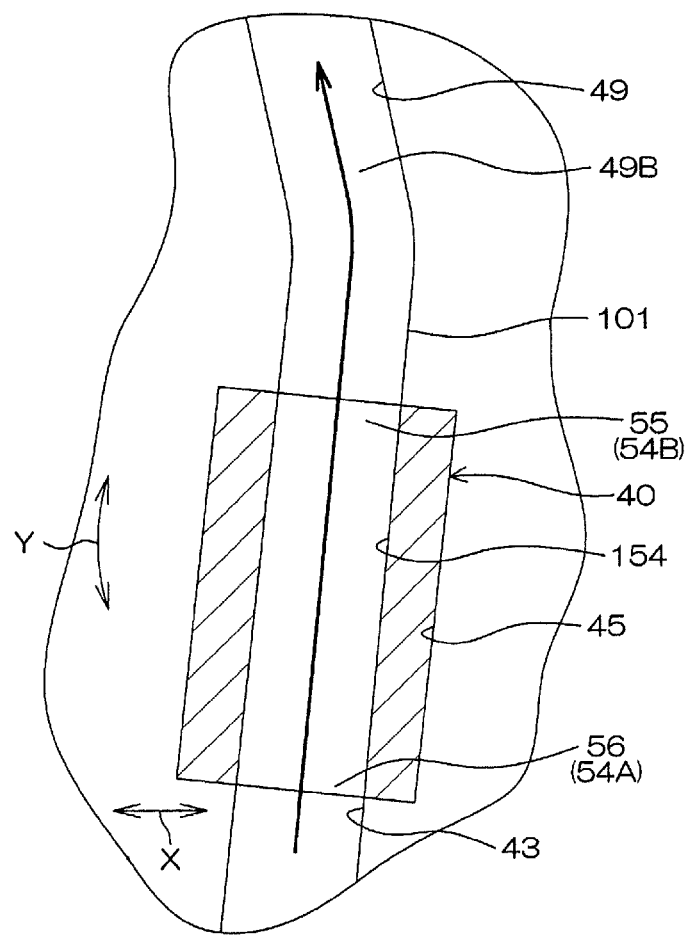
FIG. 10 is a view for describing connection between an outer periphery turning groove and a groove according to a first modified example of the first embodiment of the invention.

The first embodiment of the invention has been described above, but the invention is not limited to the above-described embodiment. For example, the configuration of the connection passage 54 of each deflector 40 may be changed. FIG. 10 is a view for describing connection between an outer periphery turning groove 49 and the groove 43 according to a first modified example of the first embodiment. As illustrated in FIG. 10, a connection passage 154 linearly extends along the groove 43 in the circumferential direction Y. The connection passage 154 has the same shape as that of the connection passage 54 (see FIG. 8) in a section taken along the direction extending along the connection passage 154 and perpendicular to the circumferential direction Y In this case, a connection groove 101 that connects the spiral outer periphery turning groove 49 to the connection passage 154 is formed in the outer peripheral face 10B of the ball nut 10. The connection groove 101 extends substantially linearly along the connection passage 154, and is connected to the other end 49B of the outer periphery turning groove 49. In the above-described first embodiment, the deflectors 40 are arranged at the same position in the circumferential direction Y. Alternatively, as illustrated in FIG. 11, the deflectors 40 may be arranged at different positions in the circumferential direction Y.

Figure 11:
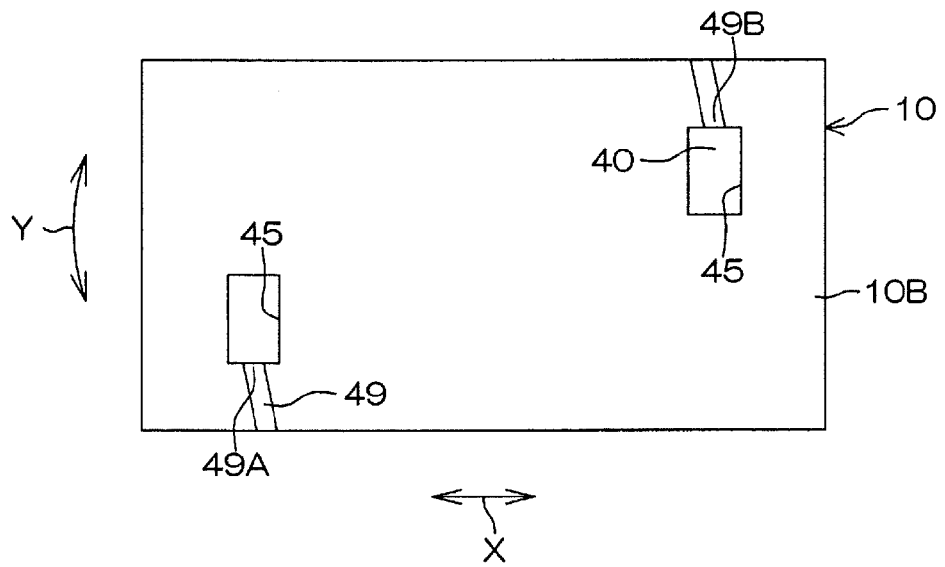
FIG. 11 is a view for describing arrangement of accommodation holes and deflectors according to a second modified example of the first embodiment of the invention.

FIG. 11 is a view for describing arrangement of accommodation holes 45 and deflectors 40 according to a second modified example of the first embodiment. The paired accommodation holes 45 are located at different positions in the circumferential direction Y. In this case, the theoretically required effective number of turns is, for example, 2.3, and the theoretically effective number of the turns (2.3) is employed as it is in a ball screw device 11. Consequently, it is possible to increase the flexibility of the layout of the positions where the deflectors 40 are arranged. As a result, it is possible to further reduce the size of the ball screw device 11 in the axial direction X.

Figure 12:
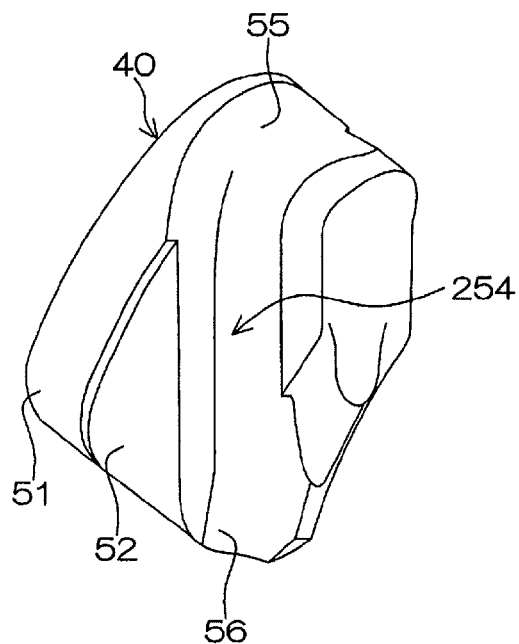
FIG. 12 is a main portion sectional view illustrating the configuration of a deflector according to a third modified example of the first embodiment of the invention.

FIG. 12 is a main portion sectional view illustrating the configuration of a deflector 40 according to a third modified example of the first embodiment. In the third modified example, as illustrated in FIG. 12, a connection passage 254 to be used in place of the connection passage 54, 154 may be a groove. The connection passage 254 is formed so as to break through a side wall of the deflector 40 along the longitudinal direction of the deflector 40.

Figure 13:
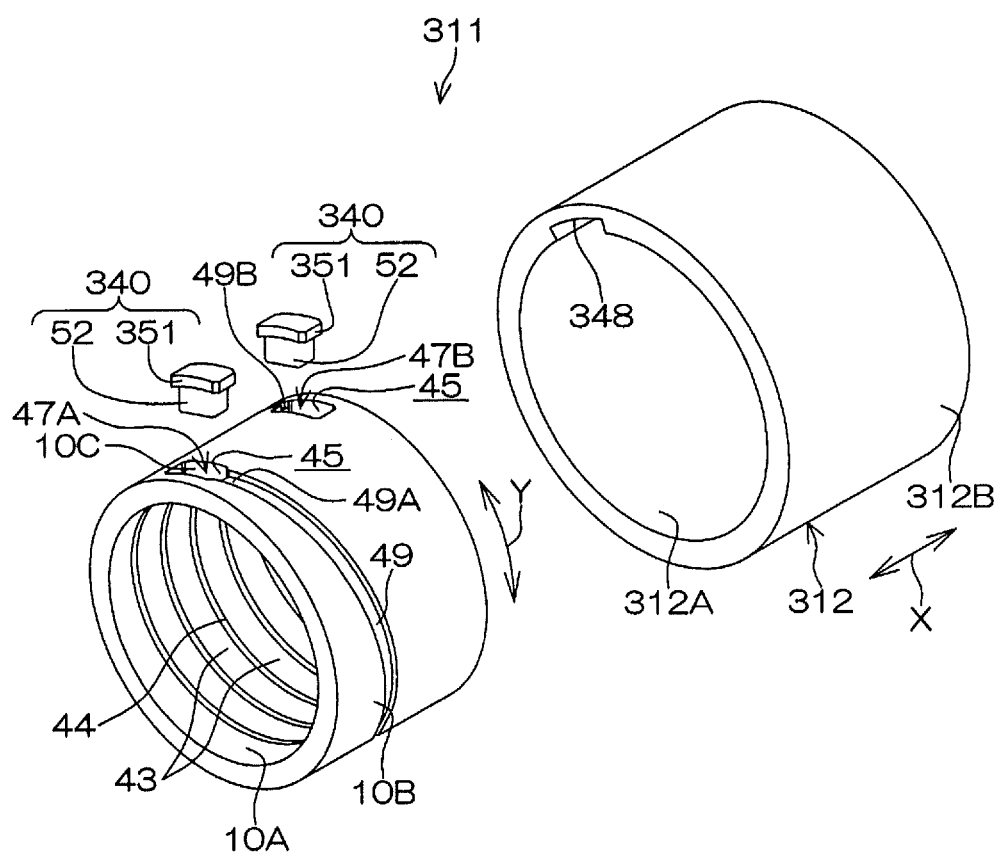
FIG. 13 is an exploded perspective view of a ball screw device according to a second embodiment of the invention.
Figure 14:
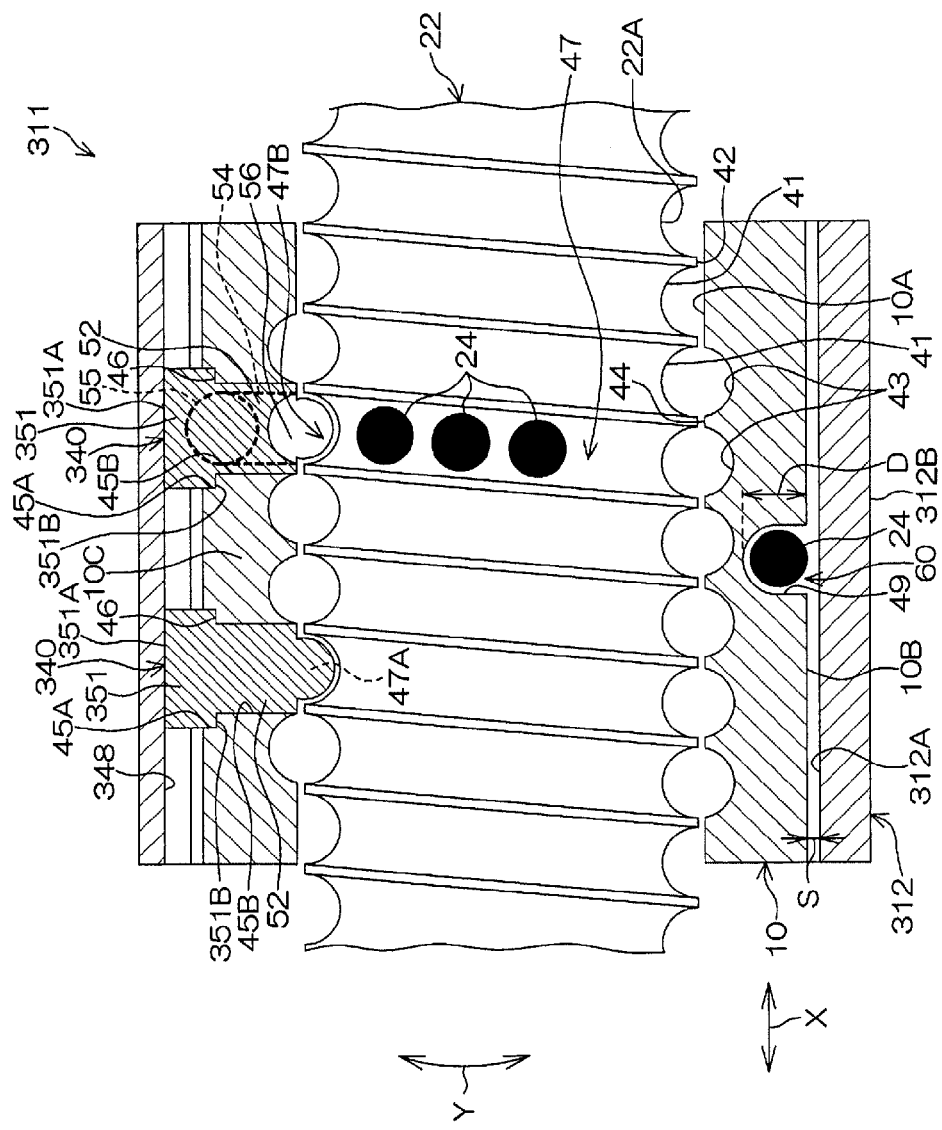
FIG. 14 is a schematic vertical sectional view of the ball screw device according to the second embodiment of the invention.

FIG. 13 is an exploded perspective view of a ball screw device 311 according to a second embodiment of the invention. FIG. 14 is a schematic vertical sectional view of the ball screw device 311. FIG. 13 illustrates the configuration of the ball screw device 311 from which the threaded shaft 22 is omitted. The ball screw device 311 is applied to, for example, an electric actuator equivalent to the electric actuator 1 described with reference to FIG. 1.

In the second embodiment, the same portions as those in the first embodiment will be denoted by the same reference symbols as those in FIG. 1 to FIG. 9, and description thereof will be omitted. As illustrated in FIG. 13 and FIG. 14, the ball screw device 311 includes the threaded shaft 22, the ball nut 10 fitted onto the threaded shaft 22, a plurality of balls 24 interposed between the threaded shaft 22 and the ball nut 10, a cylinder 312 that surrounds the outer periphery of the ball nut 10, and a pair of deflectors 340. The ball screw device 311 differs from the ball screw device 11 according to the first embodiment of the invention in that the cylinder 312 is employed as a cylinder and the deflectors 340 are employed as deflectors. In the ball screw device 311, the theoretically required effective number of turns is 2.7, and the theoretically effective number of the turns (2.7) is employed as it is.

The ball nut 10 has substantially the same configuration as that of the ball nut 10 according to the first embodiment. That is, the ball nut 10 is a tubular body made of metal such as steel and extending in an axial direction X, and the inner peripheral face 10A and the outer peripheral face 10B of the ball nut 10 are cylindrical faces each having the central axis extending in the axial direction X. In the inner peripheral face 10A of the ball nut 10, two accommodation holes 45 that pass through the peripheral wall 10C of the ball nut 10 in its thickness direction are formed respectively at the rolling start position 47A and the rolling end position 47B.

Figure 15:
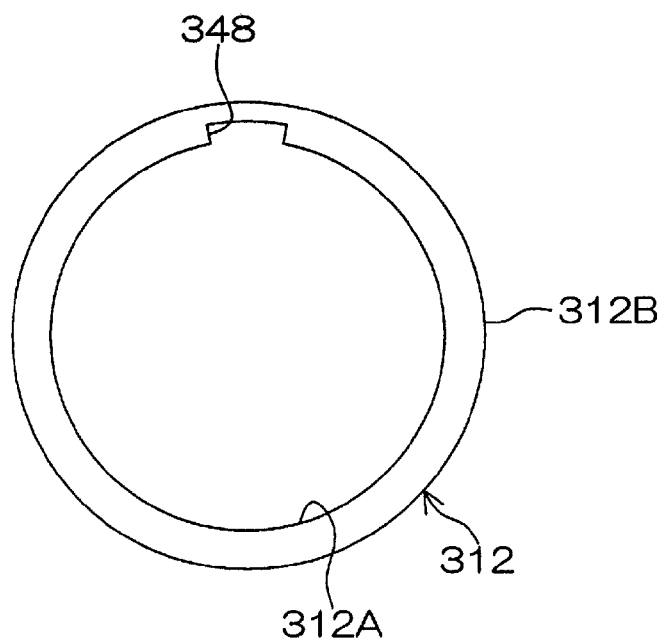
FIG. 15 is a schematic sectional view of a cylinder according to the second embodiment of the invention.
Figure 16:
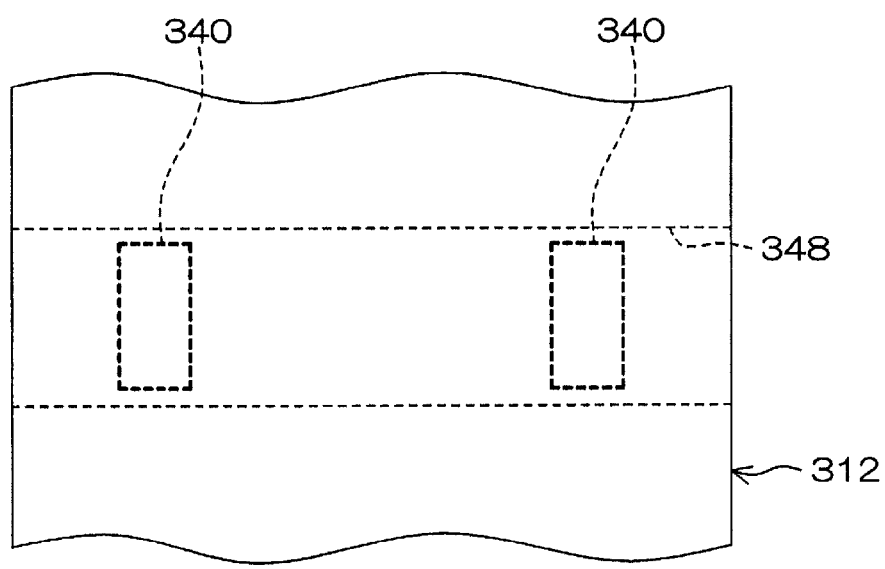
FIG. 16 is a schematic side view of the cylinder according to the second embodiment of the invention.

FIG. 15 is a schematic sectional view of the cylinder 312. FIG. 16 is a schematic side view of the cylinder 312. As illustrated in FIG. 13 to FIG. 16, the cylinder 312 is made of metal such as steel. An inner peripheral face 312A and an outer peripheral face 312B of the cylinder 312 are cylindrical faces that are coaxial with the inner peripheral face 10A and the outer peripheral face 10B of the ball nut 10. In other words, the outer peripheral face 312B is formed only of the cylindrical face. The cylinder 312 is attached to the ball nut 10 so as to be rotatable together with the ball nut 10 in the state where the entire region of the outer peripheral face 10B of the ball nut 10 is surrounded by the cylinder 312. The inner diameter of the cylinder 312 is set slightly larger than the outer diameter of the ball nut 10. In the state where the cylinder 312 is attached to the ball nut 10, the inner peripheral face 312A of the cylinder 312 is disposed radially outward of the outer peripheral face 10B of the ball nut 10 across a small space S. The cylinder 312 differs from the cylinder 12 according to the first embodiment of the invention in that an axial groove 348 is formed as an engagement recess in place of a pair of engagement holes 48.

In the inner peripheral face 312A of the cylinder 312, the axial groove 348 is formed as the engagement recess. The axial groove 348 is formed such that outer portions 351 of the deflectors 340 can be engaged with the axial groove 348. The axial groove 348 linearly extends along the axial direction X from one end (the left end illustrated in FIG. 14) in the axial direction X of the cylinder 312 to the other end (the right end illustrated in FIG. 14) in the axial direction X of the cylinder 312. As illustrated in FIG. 13 to FIG. 16, the axial groove 348 has a constant width in the circumferential direction Y and a constant depth. In the state where the cylinder 312 is disposed so as to be rotatable together with the ball nut 10, the shape of the axial groove 348 as viewed from the outside in the radial direction overlaps with outer regions 45A of the two accommodation holes 45. The groove width of the axial groove 348 is set to the same length as the length of each deflector 340 along the circumferential direction Y so that the ball nut 10 and the cylinder 312 are prevented from rotating relative to each other in the state where the deflectors 340 (described below) are engaged with the axial groove 348.

The deflectors 340 are small pieces. The number of the deflectors 40 is the same as the number of the accommodation holes 45 (two in the present embodiment). Each deflector 340 is fitted in a corresponding one of the accommodation holes 45. Each deflector 40 is accommodated in a corresponding one of the accommodation holes 45. In this state, the outer portion 351 that projects outward from the outer peripheral face 10B of the ball nut 10 are engaged with the axial groove 348. The material of the deflectors 340 may be, for example, resin or metal, as in the case of the deflectors 30 in the first embodiment.

As illustrated in FIG. 13, the deflector 340 is a single-piece member having the outer portion 351 and the inner portion 52. Each deflector 340 has the connection passage 54 that extends therein in the form of a tunnel. The deflector 340 differs from the deflector 40 according to the first embodiment of the invention in that the thick outer portion 351 having a thickness in the radial direction, which is smaller than that of the outer portion 51 of the deflector 40 according to the first embodiment of the invention, is provided.

The outer portion 351 is a block. In the state where the cylinder 312 is attached to the ball nut 10, the outer portion 351 has such a shape as to match the outer region 45A of the accommodation hole 45 as viewed from the outside in the radial direction. The outer portion 351 is, for example, a rectangular parallelepiped body in which edges of four corners are chamfered. The outer face of the outer portion 351 will be referred to as an outer face 351A. The outer face 351A is formed in such a shape as to conform to the bottom face of the axial groove 348. That is, when the bottom face of the axial groove 348 has a circular-arc sectional shape (has a curvature in the circumferential direction Y), the outer face 351A is curved along the bottom face of the axial groove 348, whereas when the bottom face of the axial groove 348 is a flat face (has no curvature in the circumferential direction Y), the outer face 351A is also a flat face.

The assembly of the ball screw device 311 will be described. A worker first inserts the deflectors 340 into the accommodation holes 45 of the ball nut 10 from the outside in its radial direction to fit the deflectors 340 in the accommodation holes 45. In the state where each deflector 340 is fitted in a corresponding one of the accommodation holes 45, the inner portion 52 of the deflector 340 is accommodated in the inner region 45B of the accommodation hole 45. In the state where each deflector 340 is fitted in a corresponding one of the accommodation holes 45, part of the outer portion 351 of the deflector 340 is accommodated in the outer region 45A of the accommodation hole 45, but a major part of the outer portion 351 of the deflector 340 projects outward from the outer peripheral face 10B of the ball nut 10.

At this time, the peripheral edge portion of an inner face 351B of the outer portion 351 (a face of the outer portion 351, which is on the opposite side of the outer portion 351 from the outer face 351A) is brought into contact with the step portion 46 in the accommodation hole 45 from the outside in the radial direction of the ball nut 10, and the deflector 340 is positioned in the accommodation hole 45. Furthermore, four corners of the rectangular outer portion 351 are crimped from the outer face 351A side, so that each deflector 340 is fixed to the outer peripheral face 10B of the ball nut 10. Note that it is not necessary to crimp all the four corners of the outer portion 351, as long as at least two corners of the outer portions 351 are crimped.

The deflector 340 may be positioned in the accommodation hole 45 by crimping a portion of the ball nut 10 instead of crimping the deflector 340. Furthermore, the deflector 340 need not be fixed to the outer peripheral face 10B of the ball nut 10. The deflector 340 is prevented from being detached from the accommodation hole 45 by the bottom face of the axial groove 348 of the cylinder 312. Even if the deflector 340 is not fixed to the outer peripheral face 10B, the deflector 340 is retained in the accommodation hole 45.

Next, the cylinder 312 and the ball nut 10 are aligned with each other such that the position of the axial groove 348 coincides with the position of the outer portion 351 of each deflector 340 in the circumferential direction Y. Then, the ball nut 10 is moved relative to the cylinder 312 in the axial direction X while fitting the outer portions 351 of the deflectors 340 into the axial groove 348, so that the ball nut 10 to which the deflectors 340 have been attached is inserted in the cylinder 312 along the axial direction X from one side or the other side of the cylinder 312 in the axial direction X. In the state where the deflectors 340 are engaged with the axial groove 348, the deflectors 340 are just engaged with the axial groove 348 in the circumferential direction Y. In the state where the ball nut 10 is inserted in the cylinder 312, the deflectors 340 fitted in the accommodation holes 45 are engaged with the axial groove 348, so that the rotation of the cylinder 312 relative to the ball nut 10 is prohibited. In other words, in the second embodiment, a relative rotation prohibiting structure has the axial groove 348 and the deflectors 340. In the relative rotation prohibiting structure, part of each deflector 340 accommodated in the accommodation hole 45 is fitted in (engaged with) the axial groove 348.

The deflector 340 fitted in the accommodation hole 45 on the rolling start position 47A side (lower left side in FIG. 13) and the deflector 340 fitted in the accommodation hole 45 on the rolling end position 47B side (upper right side in FIG. 13) are disposed so as to be oriented toward the opposite sides in the circumferential direction Y. One of the deflectors 340 is fitted in the accommodation hole 45 on the rolling start position 47A side (lower left side in FIG. 13) such that the outer opening 55 of the deflector 340 faces the one end 49A of the outer periphery turning groove 49, and the other one of the deflectors 340 is fitted in the accommodation hole 45 on the rolling end position 47B side (upper right side in FIG. 13) such that the outer opening 55 of the deflector 340 faces the other end 49B of the outer periphery turning groove 49.

Thus, the connection passages 54 of the two deflectors 340 and the turning rolling path 60 formed by the outer periphery turning groove 49 and the inner peripheral face 312A of the cylinder 312 constitute a bypass of the ball rolling paths 47 in the axial direction X. In other words, the turning rolling path 60 and the two connection passages 54 constitute the circulation path 61 through which the balls 24 are returned from the rolling end position 47B in the ball rolling path 47 to the rolling start position 47A in the ball rolling path 47.

Figure 17:
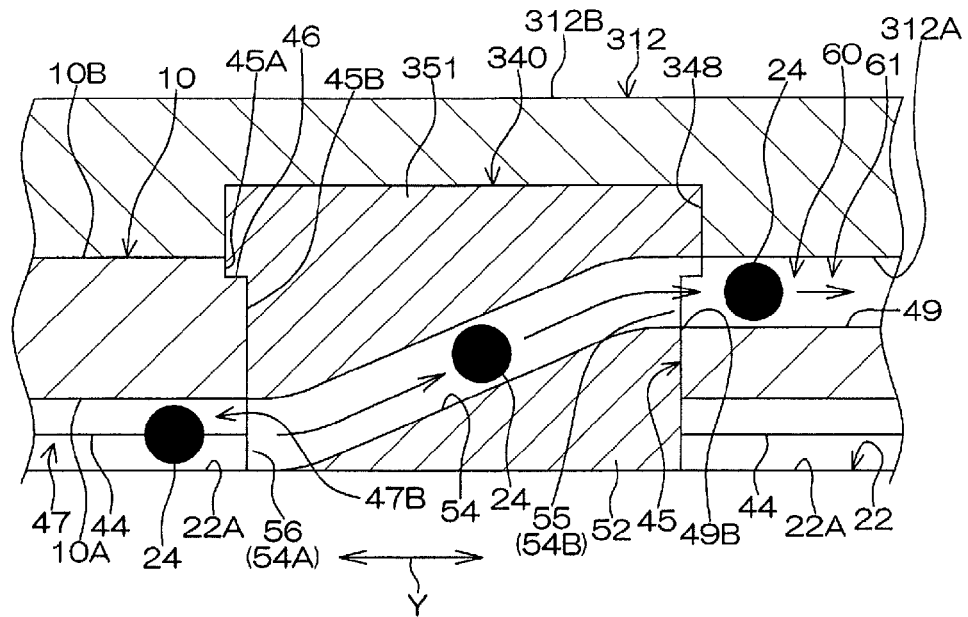
FIG. 17 is a schematic cross-sectional view of the ball screw device according to the second embodiment of the invention.
Figure 18:
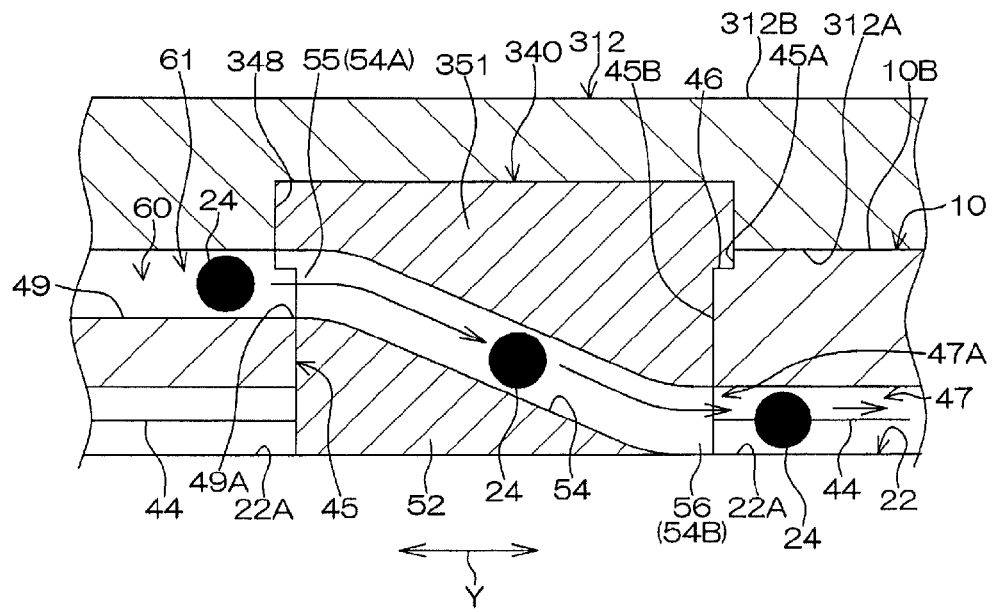
FIG. 18 is a schematic cross-sectional view of the ball screw device according to the second embodiment of the invention.

FIG. 17 and FIG. 18 are schematic cross-sectional views of the ball screw device 311. FIG. 17 illustrates the ball screw device 311 in a section taken along the direction in which the connection passage 54 of the deflector 340 fitted in the accommodation hole 45 on the rolling end position 47B side (upper right side in FIG. 13) extends. FIG. 18 illustrates the ball screw device 311 in a section taken along the direction in which the connection passage 54 of the deflector 340 fitted in the accommodation hole 45 on the rolling start position 47A side (lower left side in FIG. 13) extends.

As illustrated in FIG. 13 and FIG. 17, the deflector 340 fitted in the accommodation hole 45 on the rolling end position 47B side (upper right side in FIG. 13) is used to guide the balls 24 from the ball rolling paths 47 formed on the inner periphery of the ball nut 10 to the turning rolling path 60 formed on the outer periphery of the ball nut 10. The inner opening 56 of the connection passage 54 functions as the inlet 54A, and the outer opening 55 of the connection passage 54 functions as the outlet 54B.

As illustrated in FIG. 13 and FIG. 18, the deflector 340 fitted in the accommodation hole 45 on the rolling start position 47A side (lower left side in FIG. 13) is used to guide the balls 24 from the turning rolling path 60 formed on the outer periphery of the ball nut 10 to the ball rolling paths 47 formed on the inner periphery of the ball nut 10. The outer opening 55 of the connection passage 54 functions as the inlet 54A, and the inner opening 56 of the connection passage 54 functions as the outlet 54B. Note that the deflector 340 fitted in the accommodation hole 45 on the rolling start position 47A side (lower left side in FIG. 3) has the same design as that of the deflector 340 fitted in the accommodation hole 45 on the rolling end position 47B side (upper right side in FIG. 3).

In each deflector 340 as well as in each deflector 40 in the first embodiment, the connection passage 54 is bent in a doglegged form along the circumferential direction Y, so that the connection passage 54 provides communication between the groove 43 and the outer periphery turning groove 49 that extends in the directions different from each other. The movement of the balls 24 of the ball screw device 311 according to the second embodiment will be described with reference to FIG. 13, FIG. 17 and FIG. 18. In the ball screw device 311 as well as in the ball screw device 11 in the first embodiment (see FIG. 3 and FIG. 6), the balls 24 in the ball rolling paths 47 move from the rolling start position 47A to the rolling end position 47B along the ball rolling paths 47 while rolling in the ball rolling paths 47 as the ball nut 10 rotates. When each ball 24 reaches the rolling end position 47B, the ball 24 enters the connection passage 54 from the inner opening 56 of the connection passage 54 of the deflector 340 fitted in the accommodation hole 45 on the rolling end position 47B side (upper right side in FIG. 13), passes through the connection passage 54, and is picked up into the outer periphery turning groove 49 of the outer peripheral face 10B of the ball nut 10.

The ball 24 moves through the turning rolling path 60 including the outer periphery turning groove 49 to turn around the outer periphery of the ball nut 10, thereby advancing in a direction opposite to the direction in which the ball 24 has been advancing in the axial direction X (thereby advancing in a direction toward the left side in FIG. 6). Then, the ball 24, which has passed through the turning rolling path 60, enters the connection passage 54 from the outer opening 55 (the inlet 54A) of the connection passage 54 of the deflector 340 fitted in the accommodation hole 45 on the rolling start position 47A side (lower left side in FIG. 3), passes through the connection passage 54, and is returned to the rolling start position 47A in the ball rolling path 47. The balls 24 moving in the ball rolling paths 47 are circulated through the circulation path 61 including the turning rolling path 60 and the connection passages 54. Thus, it is possible to stably supply the balls 24 into the ball rolling paths 47.

According to the second embodiment described above, the same advantageous effects as those in the first embodiment are produced. That is, the ball 24 is returned from the rolling end position 47B in the ball rolling path 47 to the rolling start position 47A in the ball rolling path 47 through the circulation path 61 including the turning rolling path 60. Thus, it is possible to smoothly circulate the balls 24 through the ball rolling paths 47. Further, regardless of the relative positional relationship between the rolling start position 47A and the rolling end position 47B in the axial direction X and in the circumferential direction Y, it is possible to connect the rolling start position 47A and the rolling end position 47B via the circulation path 61. There is no limitation on the relative positions in the circumferential direction Y, where the deflectors 340 are arranged, unlike in the case where a through-hole extending along the axial direction X is formed in the peripheral wall 10C of the ball nut 10. As a result, the theoretically effective number of the turns of the ball screw device 311 can be employed as it is. Consequently, it is possible to reduce the size of the ball screw device 311 in the axial direction X.

According to the second embodiment, each deflector 340 fitted in a corresponding one of the accommodation holes 45 is engaged with the axial groove 348, so that the rotation of the cylinder 312 relative to the ball nut 10 is prohibited. Thus, the relative rotation prohibiting structure is formed without using additional components. As a result, it is possible to prevent the number of components from increasing while prohibiting the rotation of the cylinder 312 relative to the ball nut 10.

As an example of the configuration of the axial groove 348 formed in the inner peripheral face 312A of the cylinder 312, there has been described the configuration in which the axial groove 348 extends from one end (left end in FIG. 16) to the other end (right end in FIG. 16) of the cylinder 312 in the axial direction X (the axial groove 348 extends through the cylinder 312 in the axial direction X). However, a groove that extends from one end or the other end of the cylinder 312 in the axial direction X to an intermediate portion of the cylinder 312 in the axial direction X (an intermediate position between the one end and the other end of the cylinder 312) may be employed as the axial groove. In this case, the axial groove needs to have such a length as to be engageable with both the two deflectors 340 fitted in the accommodation holes 45 of the ball nut 10.

Figure 19:
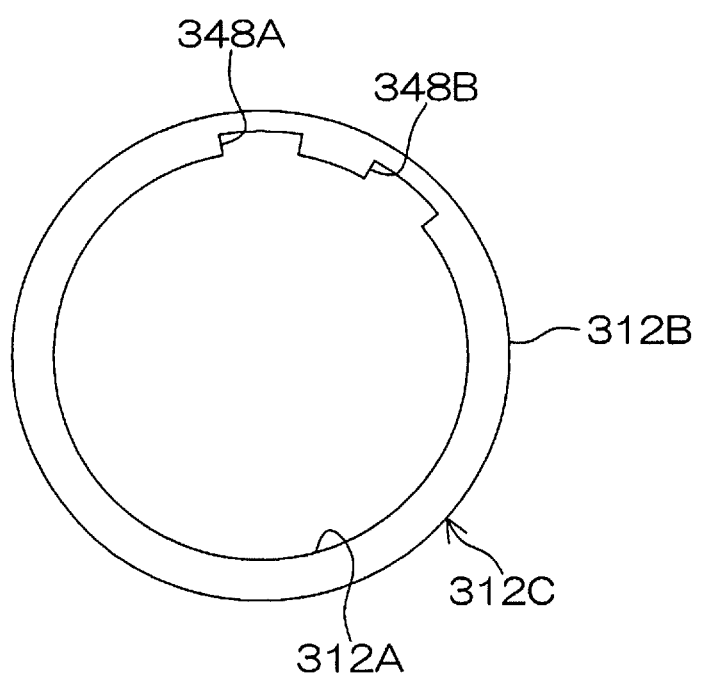
FIG. 19 is a schematic cross-sectional view illustrating a cylinder according to a first modified example of the second embodiment of the invention.
Figure 20A:
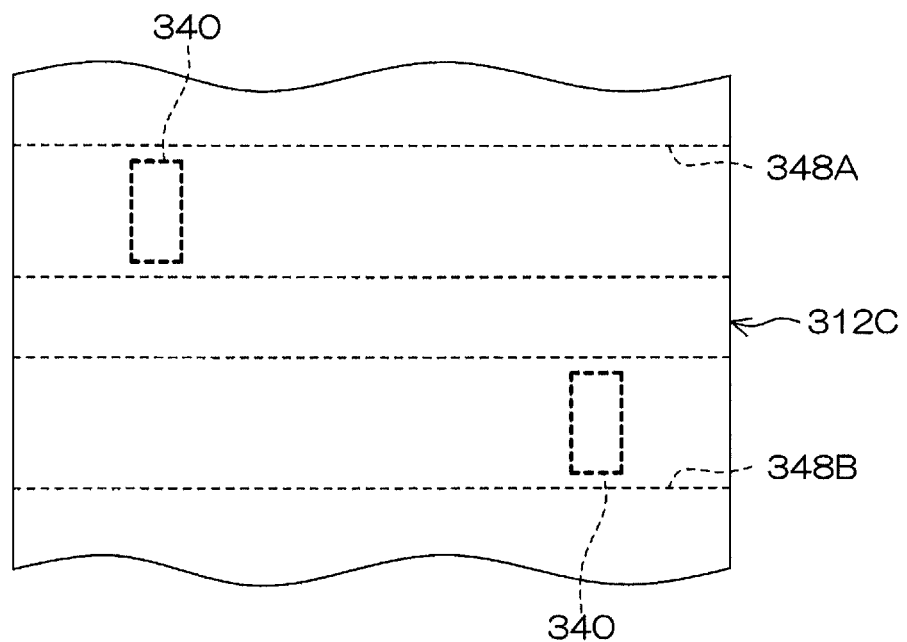
FIG. 20A is a schematic side view of the cylinder according to the first modified example of the second embodiment of the invention.

In the above-described second embodiment illustrated in FIG. 13 to FIG. 18, the deflectors 40 are arranged at the same position in the circumferential direction Y. Alternatively, the deflectors 40 may be arranged at different positions in the circumferential direction Y. In this case, the paired accommodation holes 45 may be arranged at different positions in the circumferential direction Y. A first modified example in which such a configuration is employed will be described with reference to FIG. 19 and FIG. 20A. FIG. 19 and FIG. 20A are views illustrating the configuration of a cylinder 312C according to the first modified example of the second embodiment of the invention. FIG. 19 illustrates a schematic cross-sectional view, and FIG. 20A illustrates a schematic side view.

The cylinder 312C differs from the cylinder 312 in that two axial grooves 348A, 348B offset from each other in the circumferential direction Y are formed as engagement recesses. There is no difference in the other configurations between the cylinder 312C and the cylinder 312. The axial groove 348A is formed such that the outer portion 351 of the deflector 340 fitted in the accommodation hole 45 on the rolling start position 47A side can be engaged with the axial groove 348A. The axial groove 348A linearly extends along the axial direction X from one end (left end in FIG. 20A) of the cylinder 312C in the axial direction X to the other end (right end of FIG. 20A) of the cylinder 312C in the axial direction X. The axial groove 348A has a constant width in the circumferential direction Y and a constant depth. In the state where the cylinder 312C is disposed so as to be rotatable together with the ball nut 10, the shape of the axial groove 348A as viewed from the outside in the radial direction overlaps with outer regions 45A of the accommodation hole 45 on the rolling start position 47A side. The groove width of the axial groove 348A is set to the same length as the length of the deflector 340, which is fitted in the accommodation hole 45 on the rolling start position 47A side, along the circumferential direction Y.

In the state where the deflector 340 is fitted in the accommodation hole 45 on the rolling start position 47A side, the outer portion 351 that projects outward from the outer peripheral face 10B of the ball nut 10 is engaged with the axial groove 348A. The axial groove 348B is formed such that the outer portion 351 of the deflector 340 fitted in the accommodation hole 45 on the rolling end position 47B side can be engaged with the axial groove 348B. The axial groove 348B linearly extends along the axial direction X from one end (left end in FIG. 20A) of the cylinder 312C in the axial direction X to the other end (right end of FIG. 20A) of the cylinder 312C in the axial direction X. The axial groove 348B has a constant width in the circumferential direction Y and a constant depth. In the state where the cylinder 312C is disposed so as to be rotatable together with the ball nut 10, the shape of the axial groove 348B as viewed from the outside in the radial direction overlaps with outer regions 45A of the accommodation hole 45 on the rolling end position 47B side. The groove width of the axial groove 348B is set to the same length as the length of the deflector 340, which is fitted in the accommodation hole 45 on the rolling end position 47B side, along the circumferential direction Y.

In the state where the deflector 340 is fitted in the accommodation hole 45 on the rolling end position 47B side, the outer portion 351 that projects outward from the outer peripheral face 10B of the ball nut 10 is engaged with the axial groove 348B. Due to the engagement of the deflectors 340 fitted in the accommodation holes 45 with the axial grooves 348A, 348B, the rotation of the cylinder 312C relative to the ball nut 10 is prohibited. In other words, in the first modified example of the second embodiment illustrated in FIG. 19 and FIG. 20A, "relative rotation prohibiting structure" in the appended claims has the axial grooves 348A, 348B and the deflectors 340. Further, in the relative rotation prohibiting structure, parts of the deflectors 340 accommodated in the accommodation holes 45 are fitted in (engaged with) the axial grooves 348A, 348B.

In this case, the theoretically required effective number of turns is employed as it is in the ball screw device 311. Consequently, it is possible to increase the flexibility of the layout of the positions where the deflectors 340 are arranged. As a result, it is possible to further reduce the size of the ball screw device 311 in the axial direction X. Note that grooves that extend from one end or the other end of the cylinder 312 in the axial direction X to an intermediate portion of the cylinder 312 in the axial direction X (an intermediate position between the one end and the other end of the cylinder 312) may be employed as the axial grooves 348A, 348B formed in the inner peripheral face 312A of the cylinder 312C. In this case, the axial groove 348A and the axial groove 348B need to extend over an end portion at the same end (the one end or the other end) in the axial direction X. Furthermore, the axial groove 348A needs to have such a length as to be engageable with the deflector 340 fitted in the accommodation hole 45 on the rolling start position 47A side (lower left side in FIG. 13), and the axial groove 348B needs to have such a length as to be engageable with the deflector 340 fitted in the accommodation hole 45 on the rolling end position 47B side (upper right side in FIG. 13).

Figure 20B:
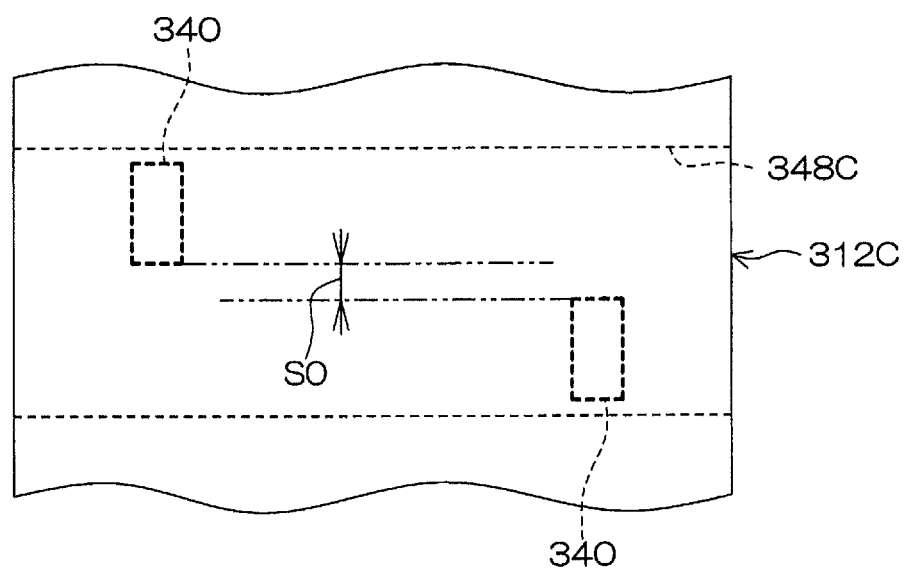
FIG. 20B is a schematic side view of the cylinder according to a second modified example of the second embodiment of the invention.

When the positions where the paired deflectors 340 are arranged are offset from each other in the circumferential direction Y, but, as illustrated in FIG. 20B, a distance S0 between the positions in the circumferential direction Y, where the deflectors 340 are arranged, is small, a single axial groove 348C may be formed in the inner peripheral face 312A of the cylinder 312C and the paired deflectors 340 may be accommodated in the axial groove 348C. This is a second modified example of the second embodiment. The groove width of the single axial groove 348C is set to such a value that the two deflectors 340 offset from each other in the circumferential direction Y can be accommodated in the single axial groove 348C. In this case, the axial groove 348C may be regarded as an axial groove formed by combining (integrating) the axial grooves 348A, 348B in the first modified example with each other in the circumferential direction Y.

Even when the positions where the paired deflectors 340 are arranged are partially overlapped with each other in the circumferential direction Y, a single axial groove (having the same configuration as that of the axial groove 348C) may be formed in the inner peripheral face 312A of the cylinder 312C and the two deflectors 340 offset from each other in the circumferential direction Y may be accommodated in the single axial groove. In the second embodiment, as the connection passage formed in each deflector 340, the connection passage 154 (see FIG. 10) may be employed in place of the connection passage 54 that extends linearly along the groove 43 in the circumferential direction Y. In this case as well as in the first modified example of the first embodiment of the invention, the connection groove 101 that connects the spiral outer periphery turning groove 49 to the connection passage 154 is formed in the outer peripheral face 10B of the ball nut 10, and the connection groove 101 substantially linearly extends along the connection passage 154 and is connected to the other end 49B of the outer periphery turning groove 49.

In the second embodiment, as the connection passage formed in each deflector 340, the connection passage 254 in the form of a groove (see FIG. 12) may be formed in place of the connection passage 54, 154. In this case as well as in the third modified example of the first embodiment of the invention, the connection passage 254 is formed so as to break through a side wall of the deflector 340 along the longitudinal direction of the deflector 340.

Figure 21:
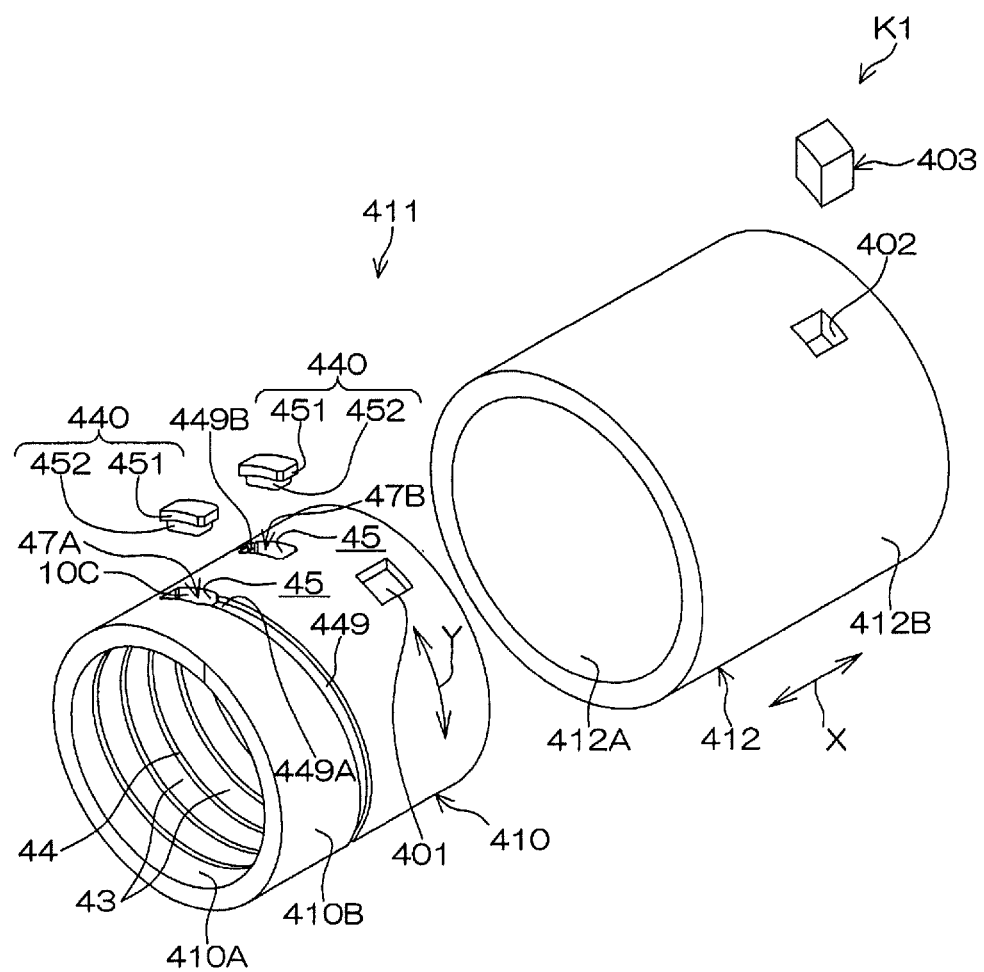
FIG. 21 is an exploded perspective view of a ball screw device according to a third embodiment of the invention.
Figure 22:
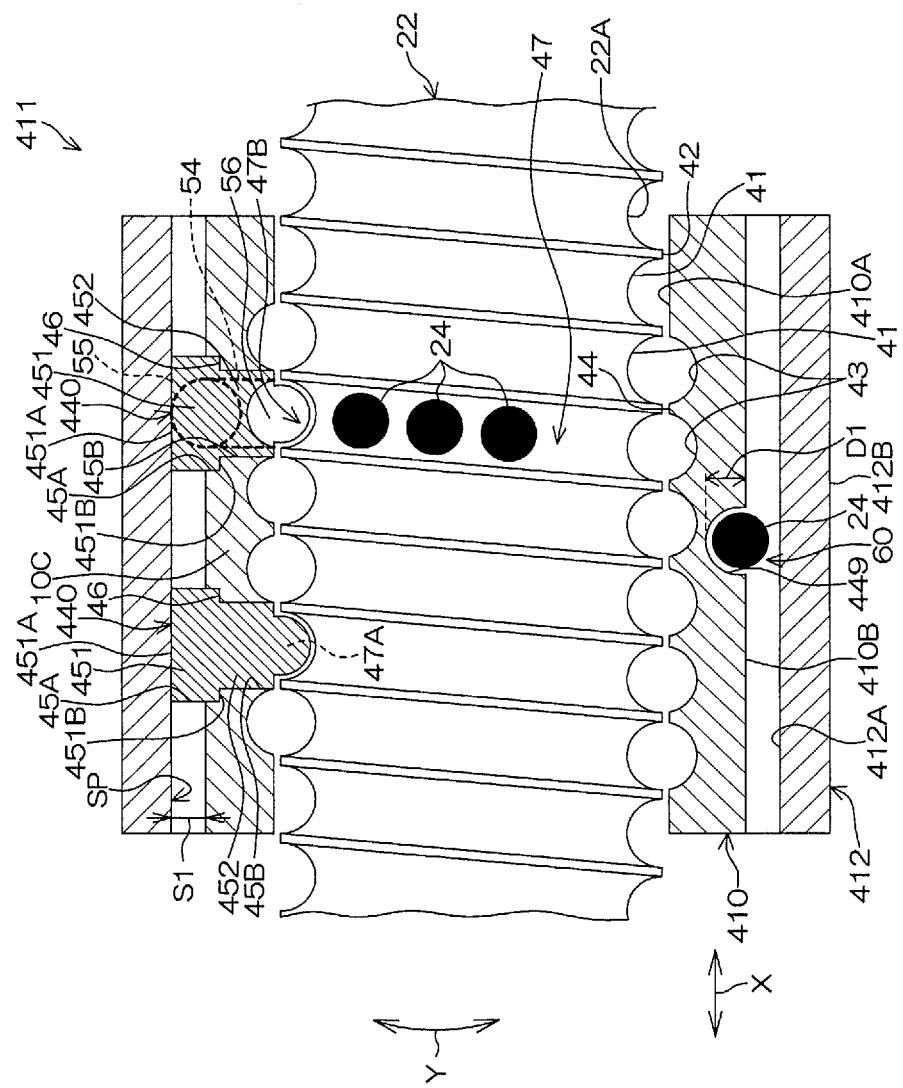
FIG. 22 is a schematic vertical sectional view of the ball screw device according to the third embodiment of the invention.
Figure 23:
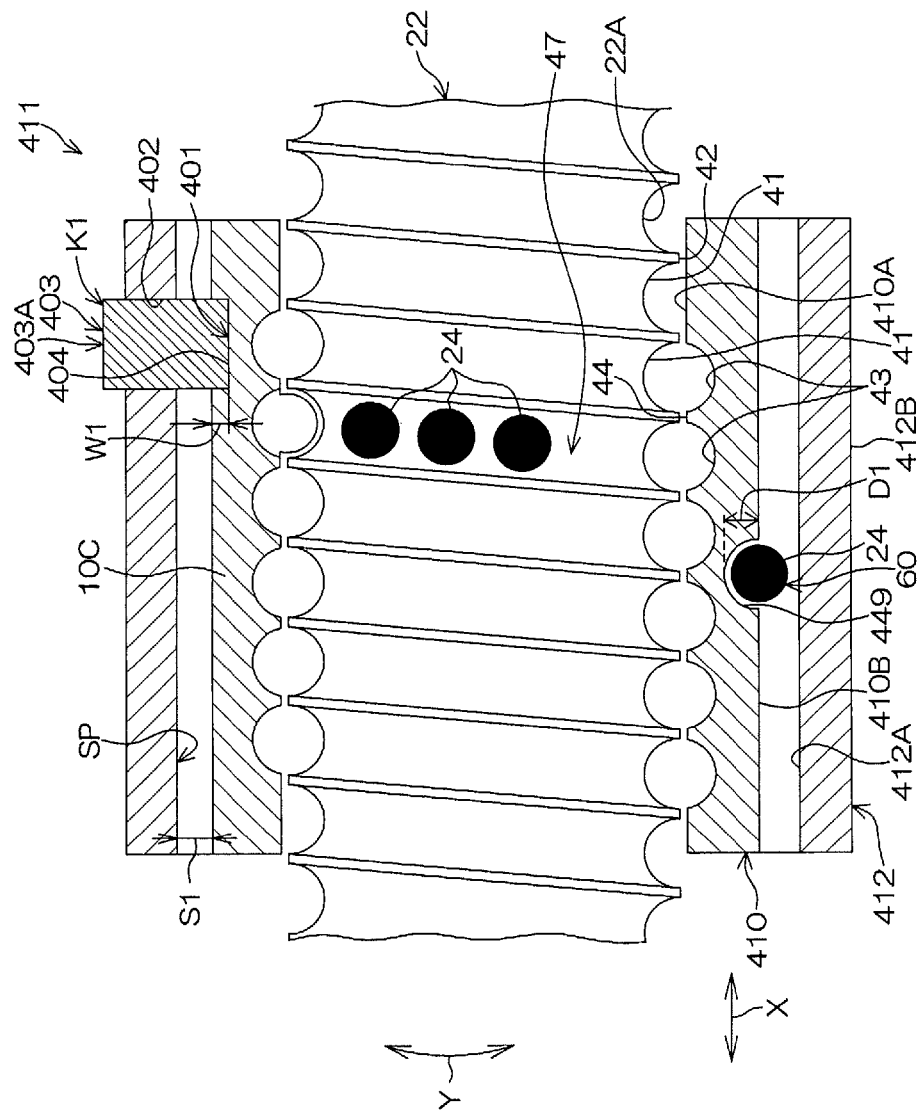
FIG. 23 is a schematic vertical sectional view of the ball screw device according to the third embodiment of the invention.

FIG. 21 is an exploded perspective view of a ball screw device 411 according to a third embodiment of the invention. FIG. 22 and FIG. 23 are schematic vertical sectional views of the ball screw device 411. FIG. 21 illustrates the configuration of the ball screw device 411 from which the threaded shaft 22 is omitted. The ball screw device 411 is applied to, for example, an electric actuator equivalent to the electric actuator 1 described with reference to FIG. 1.

In the third embodiment, the same portions as those in the first embodiment will be denoted by the same reference symbols as those in FIG. 1 to FIG. 9, and description thereof will be omitted. As illustrated in FIG. 21 to FIG. 23, the ball screw device 411 includes the threaded shaft 22, a ball nut 410 fitted onto the threaded shaft 22, a plurality of balls 24 interposed between the threaded shaft 22 and the ball nut 410, a cylinder 412 that surrounds the outer periphery of the ball nut 410, a pair of deflectors 440, and a key fitting structure K1 for connecting the cylinder 412 to the ball nut 410. The key fitting structure K1 has a ball nut key groove (ball nut key recess) 401 formed in an outer peripheral face 410B of the ball nut 410, a cylinder key hole 402 formed in the cylinder 412, and a key 403 fitted in both the ball nut key groove 401 and the cylinder key hole 402.

In the present embodiment, an inner peripheral face 412A of the cylinder 412 is disposed radially outward of the outer peripheral face 410B of the ball nut 410 across a predetermined space S1 (see FIG. 22 and FIG. 23), in the entire region in the circumferential direction Y, and an outer periphery turning groove 449 is formed by a shallow groove. In this respect, the ball screw device 411 differs from the ball screw device 11. Note that the theoretically required effective number of turns of the ball screw device 411 is 2.7, and the theoretically effective number of the turns (2.7) is employed as it is.

The ball nut 410 is a tubular body made of metal such as steel and extending in the axial direction X. An inner peripheral face 410A and the outer peripheral face 410B of the ball nut 410 are cylindrical faces each having the central axis extending in the axial direction X. In the outer peripheral face 410B of the ball nut 410, the outer periphery turning groove 449 is formed. The outer periphery turning groove 449 is a spiral groove shifted to one side (left side of FIG. 4) in the axial direction X while turning around the central axis of the outer peripheral face 410B. One end 449A (see FIG. 21) of the outer periphery turning groove 449 is connected to the peripheral wall 10C that defines the accommodation hole 45 on the rolling start position 47A side (lower left side in FIG. 21), and the other end 449B of the outer periphery turning groove 449 is connected to the peripheral wall 10C that defines the accommodation hole 45 on the rolling end position 47B side (upper right side in FIG. 21). The outer periphery turning groove 449 has a generally U-shape with round corners (a generally semicircular shape) or a generally U-shape with angled corners (a generally U-shape with round corners in FIG. 22 and FIG. 23) in section. The outer periphery turning groove 449 has a groove depth D (see FIG. 22 and FIG. 23) with which the inner half of each ball 24 (illustrated by each black circle in FIG. 22 and FIG. 23) can be accommodated, and is formed through cutting performed with the use of an end mill or the like. The outer periphery turning groove 449 differs from the outer periphery turning groove 49 according to the first embodiment of the invention in the groove depth D1, and the other configurations are the same as those of the outer periphery turning groove 49. The outer periphery turning groove 449 is such a shallow groove, and hence the outer half of each ball 24 fitted in the outer periphery turning groove 449 projects outward from the outer peripheral face 410B of the ball nut 410.

In the outer peripheral face 410B of the ball nut 410, the ball nut key groove 401 is formed in an intermediate portion in the axial direction X and the circumferential direction Y excluding a position where the outer periphery turning groove 449 is formed. The shape of the ball nut key groove 401 as viewed from the outside in the radial direction is a rectangular shape. The ball nut 410 has substantially the same configuration as that of the ball nut 10 according to the first embodiment except the ball nut key groove 401 and the outer periphery turning groove 449. That is, the grooves 43 are formed in the inner peripheral face 410A of the ball nut 410, and the two accommodation holes 45 that pass through the peripheral wall 10C of the ball nut 410 in its thickness direction are formed at the rolling start position 47A and the rolling end position 47B of the inner peripheral face 410A of the ball nut 410.

As illustrated in FIG. 21 to FIG. 23, the cylinder 412 is made of metal such as steel. The inner peripheral face 412A and an outer peripheral face 412B of the cylinder 412 are cylindrical faces that are coaxial with the inner peripheral face 410A and the outer peripheral face 410B of the ball nut 410. The inner peripheral face 412A and the outer peripheral face 412B of the cylinder 412 are formed of only cylindrical faces except a position where the cylinder key hole 402 (described later) is formed. The cylinder 412 is attached to the ball nut 410 so as to be rotatable together with the ball nut 410 and movable in the axial direction X together with the ball nut 410 in the state where the entire region of the outer peripheral face 410B of the ball nut 410 is surrounded by the cylinder 412.

The inner diameter of the cylinder 412 is set larger than the outer diameter of the ball nut 410 by a predetermined amount. Therefore, in the state where the cylinder 412 is attached to the ball nut 410, the inner peripheral face 412A of the cylinder 412 is disposed radially outward of the outer peripheral face 410B of the ball nut 410 across a space S1 (see FIG. 22 and FIG. 23). For example, the space S1 has a size corresponding to approximately half the diameter of each ball 24. Therefore, in the state where the cylinder 412 is attached to the ball nut 410, an annular space SP (see FIG. 23) is formed between the inner peripheral face 412A of the cylinder 412 and the outer peripheral face 410B of the ball nut 410.

In the third embodiment, a turning rolling path 60 is formed by the outer periphery turning groove 449, the inner peripheral face 412A of the cylinder 412, and the space SP between the outer periphery turning groove 449 and the inner peripheral face 412A. In an intermediate portion of the cylinder 412 in the axial direction X and the circumferential direction Y, the cylinder key hole 402 that passes through the cylinder 412 in its thickness direction is formed. The cylinder key hole 402 is arranged so as to face the ball nut key groove 401 in the state where the cylinder 412 is attached to the ball nut 410. The cylinder key hole 402 has such a shape as to match the ball nut key groove 401 as viewed from the outside in the radial direction.

The key 403 is, for example, a quadrangular prism. The ball nut key groove 401 of the ball nut 410 has a flat bottom face 404 that extends along the outer peripheral face of the ball nut 410. The shape and the dimensions of the key 403 in a section perpendicular to the longitudinal direction of the key 403 match the shapes and the sectional dimensions of the cylinder key hole 402 and the ball nut key groove 401, respectively. The key 403 is fitted in the cylinder key hole 402 and the ball nut key groove 401 with almost no space left in the axial direction X or the circumferential direction Y.

In FIG. 23, an outer end face 403A of the key 403 projects radially outward from the outer peripheral face 412B of the cylinder 412 in the state where the key 403 is fitted in the ball nut key groove 401. When the key 403 is crimped from the outer end side, the key 403 is fixed to the outer peripheral face 412B of the cylinder 412. Note that the key 403 need not be crimped as long as the key 403 has such a shape that the key does not drop toward the ball nut 410 side.

The length of the key 403 in the radial direction need to be set longer than the length obtained by adding up a groove depth W1 of the ball nut key groove 401 and the space S1. In this case, the key 403 is not removed from the ball nut key groove 401, and engagement between the key 403 and the ball nut 410 is achieved. As a result, the rotation of the cylinder 412 relative to the ball nut 410 and the movement of the cylinder 412 relative to the ball nut 410 in the axial direction X are prohibited.

The deflectors 440 are small pieces. The number of the deflectors 440 is the same as the number of the accommodation holes 45 (two in the present embodiment). Each deflector 440 is fitted in a corresponding one of the accommodation holes 45. Each deflector 440 is accommodated in a corresponding one of the accommodation holes 45. In this state, an outer portion 451 that projects outward from the outer peripheral face 410B of the ball nut 410 is accommodated in the circular space SP. As a material of the deflectors 440 as well as the deflectors 40 according to the first embodiment, for example, resin or metal may be used.

As illustrated in FIG. 21, the deflector 440 is a single-piece member having the outer portion 451 and an inner portion 452. Each deflector 440 has the connection passage 54 that extends therein in the form of a tunnel. The deflector 440 differs from the deflector 40 according to the first embodiment of the invention in that the outer portion 451 having a thickness in the radial direction, which is smaller than that of the outer portion 51 of the deflector 40 according to the first embodiment of the invention is provided, and the inner portion 452 having a thickness in the radial direction, which is smaller than that of the inner portion 52 of the deflector 40 according to the first embodiment is provided.

The outer portion 451 is a block. In the state where the cylinder 412 is attached to the ball nut 410, the outer portion 451 has such a shape as to match the outer region 45A of the accommodation hole 45 as viewed from the outside in the radial direction. The outer portion 451 is, for example, a rectangular parallelepiped body in which edges of four corners are chamfered. The outer face of the outer portion 451 will be referred to as an outer face 451A. The outer face 451A is curved so as to be flush with the inner peripheral face 412A of the cylinder 412. That is, the outer face 451A of the outer portion 451 of the deflector 440 are in contact with the inner peripheral face 412A in the state where the cylinder 412 is attached to the ball nut 410. The thickness of the outer portion 451 in the radial direction is set such that the size of the outer portion 451 that projects from the outer peripheral face 410B of the ball nut 410 in the state where the deflector 440 is accommodated in the accommodation hole 45 substantially coincides with the size of the space S1 between the outer peripheral face 410B of the ball nut 410 and the inner peripheral face 412A of the cylinder 412.

The inner portion 452 is a block elongated along the longitudinal direction of the outer portion 451. The inner portion 452 has such a shape as to be just fitted in the inner region 45B of the accommodation hole 45 (see FIG. 22). In the inner portion 452, both end portions in the longitudinal direction are rounded. A face of the outer portion 451, which is on the opposite side of the outer portion 451 from the outer face 451A, will be referred to as an inner face 451B. The inner portion 452 is fixed to the inner face 451B. As viewed from the thickness direction of the outer portion 451, the inner portion 452 is positioned inside the contour of the outer portion 451.

The assembly of the ball screw device 411 will be described. A worker first inserts the deflectors 440 into the accommodation holes 45 of the ball nut 410 from the outside in its radial direction to fit the deflectors 440 in the accommodation holes 45. In the state where each deflector 440 is fitted in a corresponding one of the accommodation holes 45, the inner portion 452 of the deflector 440 is accommodated in the inner region 45B of the accommodation hole 45. In the state where each deflector 440 is fitted in a corresponding one of the accommodation holes 45, part of the outer portion 451 of the deflector 440 is accommodated in the outer region 45A of the accommodation hole 45, but a major part of the outer portion 451 of the deflector 440 projects outward from the outer peripheral face 410B of the ball nut 410.

The peripheral edge portion of an inner face 451B of the outer portion 451 (a face of the outer portion 451, which is on the opposite side of the outer portion 451 from the outer face 451A) is brought into contact with the step portion 46 in the accommodation hole 45 from the outside in the radial direction of the ball nut 410, and the deflector 440 is positioned in the accommodation hole 45. Furthermore, four corners of the rectangular outer portion 451 are crimped from the outer face 451A side, so that each deflector 440 is fixed to the outer peripheral face 410B of the ball nut 410. Note that it is not necessary to crimp all the four corners of the outer portion 451, as long as at least two corners of the outer portions 451 are crimped.

The deflector 440 may be positioned in the accommodation hole 45 by crimping a portion of the ball nut 410 instead of crimping the deflector 440. Furthermore, the deflector 440 need not be fixed to the outer peripheral face 410B of the ball nut 410. The deflector 440 is prevented from being detached from the accommodation hole 45 by the inner peripheral face 412A of the cylinder 412. Even if the deflector 440 is not fixed to the outer peripheral face 410B, the deflector 440 is retained in the accommodation hole 45.

The ball nut 410 to which the deflectors 440 are attached is inserted into the cylinder 412 along the axial direction X from one side or the other side of the cylinder 412 in the axial direction X. As described above, the thickness of each deflector 440 in the radial direction is set such that the size of the outer portion 451 that projects from the outer peripheral face 410B of the ball nut 410 in the state where the deflector 440 is accommodated in the accommodation hole 45 substantially coincides with the size of the space S1 between the outer peripheral face 410B of the ball nut 410 and the inner peripheral face 412A of the cylinder 412. Thus, it is possible to move the ball nut 410 relative to the cylinder 412 in the axial direction X, so that it is possible to insert the ball nut 410 in the cylinder 412.

The ball nut 410 and the cylinder 412 are moved relative to each other in the axial direction X and rotated relative to each other, so that the ball nut key groove 401 faces the cylinder key hole 402. Then, the key 403 is inserted into the cylinder key hole 402 and the ball nut key groove 401. The inserted key 403 is fitted in the cylinder key hole 402 and the ball nut key groove 401, so that the rotation of the cylinder 412 relative to the ball nut 410 is prohibited. In other words, the relative rotation prohibiting structure is the key fitting structure K1.

The deflector 440 fitted in the accommodation hole 45 on the rolling start position 47A side (lower left side in FIG. 21) and the deflector 440 fitted in the accommodation hole 45 on the rolling end position 47B side (upper right side in FIG. 21) are disposed so as to be oriented toward the opposite sides in the circumferential direction Y. One of the deflectors 440 is fitted in the accommodation hole 45 on the rolling start position 47A side (lower left side in FIG. 21) such that the outer opening 55 of the deflector 440 faces the one end 449A of the outer periphery turning groove 449, and the other one of the deflectors 440 is fitted in the accommodation hole 45 on the rolling end position 47B side (upper right side in FIG. 21) such that the outer opening 55 of the deflector 440 faces the other end 449B of the outer periphery turning groove 449.

The connection passages 54 of the two deflectors 440 and the turning rolling path 60 formed by the outer periphery turning groove 449 and the inner peripheral face 412A of the cylinder 412 constitute a bypass of the ball rolling paths 47 in the axial direction X. The turning rolling path 60 and the two connection passages 54 constitute a circulation path 61 through which the balls 24 are returned from the rolling end position 47B in the ball rolling path 47 to the rolling start position 47A in the ball rolling path 47.

Figure 24:
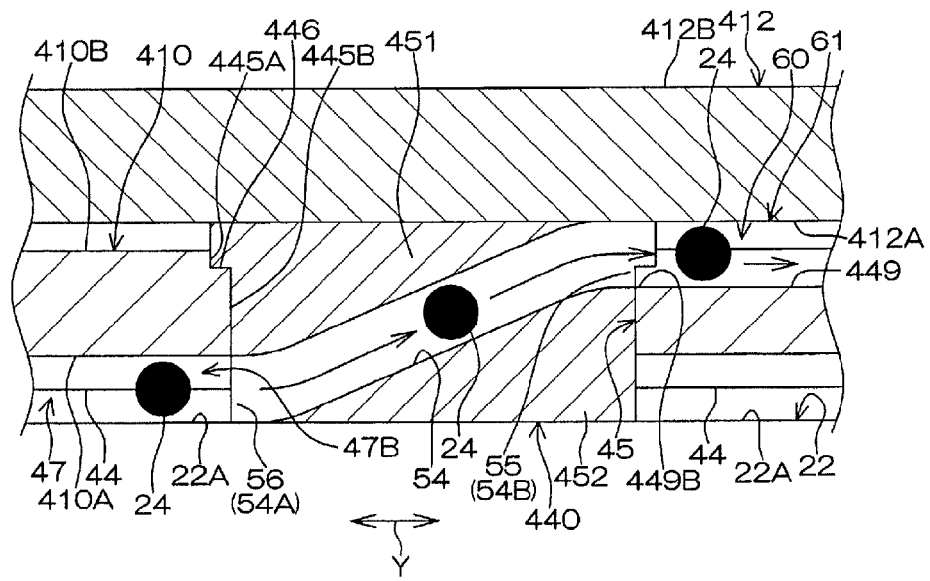
FIG. 24 is a schematic cross-sectional view of the ball screw device according to the third embodiment of the invention.
Figure 25:
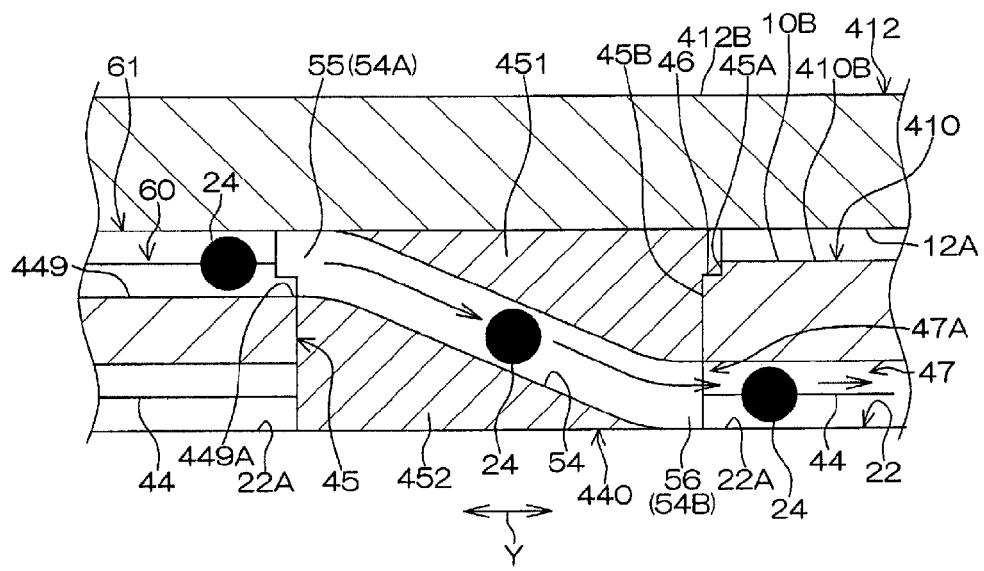
FIG. 25 is a schematic cross-sectional view of the ball screw device according to the third embodiment of the invention.

FIG. 24 and FIG. 25 are schematic cross-sectional views of the ball screw device 411. FIG. 24 illustrates the ball screw device 411 in a section taken along the direction in which the connection passage 54 of the deflector 440 fitted in the accommodation hole 45 on the rolling end position 47B side (upper right side in FIG. 21) extends. FIG. 25 illustrates the ball screw device 411 in a section taken along the direction in which the connection passage 54 of the deflector 440 fitted in the accommodation hole 45 on the rolling start position 47A side (lower left side in FIG. 21) extends.

As illustrated in FIG. 21 and FIG. 24, the deflector 440 fitted in the accommodation hole 45 on the rolling end position 47B side (upper right side in FIG. 21) is used to guide the balls 24 from the ball rolling paths 47 formed on the inner periphery of the ball nut 410 to the turning rolling path 60 formed on the outer periphery of the ball nut 410. The inner opening 56 of the connection passage 54 functions as the inlet 54A, and the outer opening 55 of the connection passage 54 functions as the outlet 54B.

As illustrated in FIG. 21 and FIG. 25, the deflector 440 fitted in the accommodation hole 45 on the rolling start position 47A side (lower left side in FIG. 21) is used to guide the balls 24 from the turning rolling path 60 formed on the outer periphery of the ball nut 410 to the ball rolling paths 47 formed on the inner periphery of the ball nut 410. The outer opening 55 of the connection passage 54 functions as the inlet 54A, and the inner opening 56 of the connection passage 54 functions as the outlet 54B. Note that the deflector 440 fitted in the accommodation hole 45 on the rolling start position 47A side (lower left side in FIG. 21) has the same design as that of the deflector 440 fitted in the accommodation hole 45 on the rolling end position 47B side (upper right side in FIG. 21).

In each deflector 440 as well as in each deflector 40 in the first embodiment, the connection passage 54 is bent in a doglegged form along the circumferential direction Y, so that the connection passage 54 provides communication between the groove 43 and the outer periphery turning groove 449 that extends in the directions different from each other. The movement of the balls 24 of the ball screw device 411 according to the third embodiment will be described with reference to FIG. 21, FIG. 24 and FIG. 25. In the ball screw device 411 as well as in the ball screw device 11 in the first embodiment (see FIG. 3 and FIG. 6), the balls 24 in the ball rolling paths 47 move from the rolling start position 47A to the rolling end position 47B along the ball rolling paths 47 while rolling in the ball rolling paths 47 as the ball nut 410 rotates. When each ball 24 reaches the rolling end position 47B, the ball 24 enters the connection passage 54 from the inner opening 56 of the connection passage 54 of the deflector 440 fitted in the accommodation hole 45 on the rolling end position 47B side (upper right side in FIG. 21), passes through the connection passage 54, and is picked up into the outer periphery turning groove 449 of the outer peripheral face 10B of the ball nut 410.

The ball 24 moves through the turning rolling path 60 including the outer periphery turning groove 449 to turn around the outer periphery of the ball nut 410, thereby advancing in a direction opposite to the direction in which the ball 24 has been advancing in the axial direction X (thereby advancing in a direction toward the left side in FIG. 21). Then, the ball 24, which has passed through the turning rolling path 60, enters the connection passage 54 from the outer opening 55 (the inlet 54A) of the connection passage 54 of the deflector 440 fitted in the accommodation hole 45 on the rolling start position 47A side (lower left side in FIG. 21), passes through the connection passage 54, and is returned to the rolling start position 47A in the ball rolling path 47. The balls 24 moving in the ball rolling paths 47 are circulated through the circulation path 61 including the turning rolling path 60 and the connection passages 54. Thus, it is possible to stably supply the balls 24 into the ball rolling paths 47.

According to the third embodiment described above, the ball 24 is returned from the rolling end position 47B in the ball rolling path 47 to the rolling start position 47A in the ball rolling path 47 through the circulation path 61 including the turning rolling path 60. Thus, it is possible to smoothly circulate the balls 24 through the ball rolling paths 47. Further, regardless of the relative positional relationship between the rolling start position 47A and the rolling end position 47B in the axial direction X and in the circumferential direction Y, it is possible to connect the rolling start position 47A and the rolling end position 47B via the circulation path 61. There is no limitation on the relative positions in the circumferential direction Y, where the deflectors 440 are arranged, unlike in the case where a through-hole extending along the axial direction X is formed in the peripheral wall 10C of the ball nut 410. As a result, the theoretically effective number of the turns of the ball screw device 411 can be employed as it is. Consequently, it is possible to reduce the size of the ball screw device 411 in the axial direction X.

In the third embodiment, as the connection passage formed in each deflector 440, the connection passage 154 (see FIG. 10) may be employed in place of the connection passage 54 that extends linearly along the groove 43 in the circumferential direction Y. In this case as well as in the first embodiment of the invention, the connection groove 101 that connects the spiral outer periphery turning groove 449 to the connection passage 154 is formed in the outer peripheral face 410B of the ball nut 410, and the connection groove 101 substantially linearly extends along the connection passage 154 and is connected to the other end 449B of the outer periphery turning groove 449.

In the third embodiment, the deflectors 440 are arranged at the same position in the circumferential direction Y. Alternatively, the deflectors 440 may be arranged at different positions in the circumferential direction Y. In this case, the theoretically effective number of the turns is employed as it is in the ball screw device 411. Consequently, it is possible to increase the flexibility of the layout of the positions where the deflectors 440 are arranged. As a result, it is possible to further reduce the size of the ball screw device 411 in the axial direction X.

In the third embodiment, as the connection passage formed in each deflector 440, the connection passage 254 in the form of a groove (see FIG. 12) may be formed in place of the connection passage 54, 154. The connection passage 254 is formed so as to break through a side wall of the deflector 440 along the longitudinal direction of the deflector 440. While the three example embodiments have been described above, the invention may be implemented in various other embodiments.

For example, in the first and second embodiments, the space between the outer peripheral face 10B of the ball nut 10 and the inner peripheral face 12A, 312A of the cylinder 12, 312 is the small space S. Alternatively, a predetermined space (e.g., the space S1 having a size of approximately half the diameter of each ball 24 as illustrated in FIG. 22 and FIG. 23) may be formed between the outer peripheral face 10B and the inner peripheral face 12A, 312A. In this case, the groove depth of the outer periphery turning groove 49 formed in the outer peripheral face 10B of the ball nut 10 is set to such a value that only part of each ball 24 is accommodated in the outer periphery turning groove 49 (e.g., the groove depth D1 of the outer periphery turning groove 449 in FIG. 22 and FIG. 23).

In the third embodiment, the space between the outer peripheral face 410B of the ball nut 410 and the inner peripheral face 412A of the cylinder 412 is the space S1 having a predetermined size. Alternatively, the outer peripheral face 410B and the inner peripheral face 412A may be opposed to each other across a small space (e.g., the space S1 illustrated in FIG. 22 and FIG. 23). In this case, the groove depth of the outer periphery turning groove 449 formed in the outer peripheral face 410B of the ball nut 410 is set to such a value that the entirety of each ball 24 is accommodated (e.g., the groove depth D of the outer periphery turning groove 49 in FIG. 4 and FIG. 14).

In the third embodiment, the key fitting structure K1 has been illustrated as one example of the relative rotation prohibiting structure. However, the relative rotation prohibiting structure is not limited to the key fitting structure K1. For example, an engagement portion having a double face width shape or a hexagonal shape may be formed in an end portion of the ball nut 410 in the axial direction X, a fitting portion that is fitted to the engagement portion may be formed in an end portion of the cylinder 412 in the axial direction X, and the relative rotation prohibiting structure may be formed of the fitting between the engagement portion and the fitting portion.

In the first to third embodiments, the step portion 46 is formed at a portion that defines each accommodation hole 45 in the ball nut 10, 410 to prevent the drop of the deflector 40, 340, 440 toward the ball nut 10, 410. Alternatively, each accommodation hole 45 may be formed only of the inner region 45B without forming the step portion 46. In the first to third embodiments, the outer periphery turning groove 49, 449 is turned once around the outer periphery of the ball nut 10, 410. Alternatively, the number of turns may be more than one. The outer periphery turning groove 49, 449 may be formed such that the number of turns in the circumferential direction is smaller than one (e.g., 0.3 or 0.5 turns).

The cylinder 12, 312, 412 may function as an inner ring of the rolling bearing 13, 16. That is, an inner ring raceway may be formed in the outer peripheral face 12B, 312B, 412B of the cylinder 12, 312, 412, and balls for the bearing may roll on the inner ring raceway.

What is claimed is:

1. A ball screw device comprising:
a threaded shaft having an outer peripheral face in which a groove is formed;
a ball nut fitted onto the threaded shaft, the ball nut having an inner peripheral face in which a groove is formed;
a plurality of balls rollably disposed in a spiral ball rolling path formed by the groove of the ball nut and the groove of the threaded shaft; and
a cylinder disposed so as to surround an outer periphery of the ball nut, wherein
in the spiral ball rolling path, accommodation recesses that pass through a peripheral wall of the ball nut in a thickness direction are formed in at least two accommodation recess formed positions that are apart from each other in an axial direction of the threaded shaft, and
in an outer peripheral face of the ball nut, an outer periphery turning groove that turns in a spiral manner along the outer periphery of the ball nut is formed, and the outer periphery turning groove and an inner peripheral face of the cylinder constitute a turning rolling path in which the balls are rollable,
deflectors accommodated in the respective accommodation recesses, each of the deflectors having a connection passage that connects a corresponding one of the accommodation recess formed positions to the turning rolling path; and
a relative rotation prohibiting structure that prohibits rotation of the cylinder relative to the ball nut, the relative rotation prohibiting structure comprising: (i) an engagement recess formed in the inner peripheral face of the cylinder; and (ii) the deflectors, the deflectors being accommodated in the accommodation recesses, and being engaged with the engagement recess, wherein
the turning rolling path and the two connection passages of each of the deflectors constitute a circulation path through which the balls are returned from one of the accommodation recess formed positions to the other one of the accommodation recess formed positions.

2. The ball screw device according to claim 1, wherein the engagement recess is each of engagement holes that pass through the cylinder in the thickness direction and that are formed in an intermediate portion of the inner peripheral face of the cylinder in the axial direction.

3. The ball screw device according to claim 1, wherein the inner peripheral face of the cylinder is formed of only a cylindrical face.

4. The ball screw device according to claim 1, wherein the engagement recess is an engagement groove formed in the inner peripheral face of the cylinder, the engagement groove extending along the axial direction.

5. The ball screw device comprising:
a threaded shaft having an outer peripheral face in which a groove is formed;
a ball nut fitted onto the threaded shaft, the ball nut having an inner peripheral face in which a groove is formed;
a plurality of balls rollably disposed in a spiral ball rolling path formed by the groove of the ball nut and the groove of the threaded shaft; and
a cylinder disposed so as to surround an outer periphery of the ball nut, wherein
in the spiral ball tolling path, accommodation recesses the pass through a peripheral wall of the ball nut in a thickness direction are formed in at least two accommodation recess formed position that are apart from each other in an axial direction of the threaded shaft; and
in an outer peripheral face of the ball nut, an outer periphery turning groove that turns in a spiral manner along the outer periphery of the ball nut is formed, and the outer periphery turning groove and an inner peripheral face of the cylinder constitute a turning rolling path in which the balls are rollable,
deflectors accommodated in the respective accommodation recesses, each of the deflectors having a connection passage that connects a corresponding one of the accommodation recess formed positions to the turning rolling path; and
a relative rotation prohibiting structure, the relative rotation prohibiting structure being a key fitting structure having a ball nut key recess formed in the outer peripheral face of the ball nut, a cylinder key recess formed in the inner peripheral face of the cylinder, and a key fitted in both the ball nut key recess and the cylinder key recess, wherein
the turning rolling path and the connection passage of each of the deflectors constitute a circulation path through which the balls are returned from one of the accommodation recess formed positions to the other one of the accommodation recess formed positions.

6. The ball screw device according to claim 1, wherein a depth of the outer periphery turning groove is set to such a value that the balls do not project outward from the outer peripheral face of the ball nut in a state where the balls are accommodated in the outer periphery turning groove.

7. The ball screw device according to claim 1, wherein:
the ball nut and the cylinder are disposed with a predetermined space formed between the outer peripheral face of the ball nut and the inner peripheral face of the cylinder; and
a depth of the outer periphery turning groove is set to such a value that the balls partially project outward from the outer peripheral face of the ball nut in a state where the balls are accommodated in the outer periphery turning groove.

* * * * *